United States Patent
Li et al.

(10) Patent No.: US 10,565,747 B2
(45) Date of Patent: Feb. 18, 2020

(54) DIFFERENTIABLE RENDERING PIPELINE FOR INVERSE GRAPHICS

(71) Applicant: NVIDIA Corporation, Santa Clara, CA (US)

(72) Inventors: Tzu-Mao Li, Cambridge, MA (US); Marco Salvi, Kirkland, WA (US); Jaakko T. Lehtinen, Helsinki (FI); Aaron Eliot Lefohn, Kirkland, WA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/113,884

(22) Filed: Aug. 27, 2018

(65) Prior Publication Data
US 2019/0087985 A1    Mar. 21, 2019

Related U.S. Application Data

(60) Provisional application No. 62/554,943, filed on Sep. 6, 2017.

(51) Int. Cl.
| | | |
|---|---|---|
| G06T 11/00 | (2006.01) | |
| G06T 15/00 | (2011.01) | |
| G06N 3/04 | (2006.01) | |
| G06T 15/60 | (2006.01) | |
| G06F 17/13 | (2006.01) | |

(52) U.S. Cl.
CPC ............ G06T 11/006 (2013.01); G06F 17/13 (2013.01); G06N 3/0454 (2013.01); G06T 15/005 (2013.01); G06T 15/60 (2013.01)

(58) Field of Classification Search
CPC ..... G06N 3/0454; G06F 17/13; G06T 11/006; G06T 15/005; G06T 15/60
USPC ................................... 345/501, 506
See application file for complete search history.

(56) References Cited

U.S. PATENT DOCUMENTS

| | | | |
|---|---|---|---|
| 6,326,964 B1 | 12/2001 | Snyder et al. | |
| 6,760,024 B1 * | 7/2004 | Lokovic | ................. G06T 15/06 345/421 |
| 6,816,161 B2 | 11/2004 | Lavelle et al. | |

(Continued)

FOREIGN PATENT DOCUMENTS

| | | |
|---|---|---|
| CN | 106127743 A | 11/2016 |
| WO | 2010041215 A1 | 4/2010 |
| WO | 2011075082 A1 | 6/2011 |

OTHER PUBLICATIONS

Aittala et al., "Reflectance Modeling by Neural Texture Synthesis," Preprint for ACM Transactions on Graphics, SIGGRAPH, 2016, 13 pages, retrieved from https://mediatech.aalto.fi/publications/graphics/NeuralSVBRDF/aittala2016_siggraph.pdf.

(Continued)

*Primary Examiner* — Jacinta M Crawford
(74) *Attorney, Agent, or Firm* — Leydig, Voit & Mayer, Ltd.

(57) ABSTRACT

A system, method, and computer readable medium for inverse graphics rendering comprise a differentiable rendering pipeline and a gradient descent optimization engine. A given scene is described using scene parameters. Visibility functions, and other rendered functions, are constructed to be continuous and differentiable, allowing the optimization engine and the rendering pipeline to efficiently iterate through increasingly refined scene models.

20 Claims, 21 Drawing Sheets

(56) References Cited

U.S. PATENT DOCUMENTS

| | | | |
|---|---|---|---|
| 8,532,367 B2 | 9/2013 | Kaganovich | |
| 8,970,586 B2 | 3/2015 | Cao et al. | |
| 2009/0265685 A1* | 10/2009 | Guenter | G06F 17/10 717/106 |
| 2010/0289797 A1 | 11/2010 | Tateno et al. | |

OTHER PUBLICATIONS

Gatys et al., "A Neural Algorithm of Artistic Style," Preprint, Sep. 2015, 16 pages, retrieved from https://arxiv.org/abs/1508.06576.

Li et al., "Anisotropic Gaussian Mutations for Metropolis Light Transport through Hessian-Hamiltonian Dynamics," Preprint, 13 pages, 2015, retrieved from https://people.csail.mit.edu/tzumao/h2mc/.

Blanz et al., "A Morphable Model For The Synthesis Of 3D Faces," Preprint, 1999, 13 pages, retrieved from http://gravis.dmi.unibas.ch/publications/Sigg99/morphmod2.pdf.

Loper et al., "OpenDR: An Approximate Differentiable Renderer," 16 pages, 2014, retrieved from http://files.is.tue.mpg.de/black/papers/OpenDR.pdf.

Sander et al., "Discontinuity Edge Overdraw," Preprint, 8 pages, 2001, retrieved from http://hhoppe.com/overdraw.pdf.

Ellis et al., "SVGPU: Real Time 3D Rendering to Vector Graphics Formats," High Performance Graphics, 2016, 9 pages.

Zwicker, "Point-Based Rendering," PowerPoint Presentation, Computer Graphics Lab, ETH Zurich, 2002, pp. 1-56.

Pereira et al., "The 3D Graphics Rendering Pipeline," Instituto Superior Tecnico, 2009/2010, 48 pages, retrieved from https://fenix.tecnico.ulisboa.pt/downloadFile/3779573130568/The.

\* cited by examiner

DIFFERENTIABLE RENDERING PIPELINE FOR INVERSE GRAPHICS

CLAIM OF PRIORITY

This application claims the benefit of U.S. Provisional Application No. 62/554,943 titled "END-TO-END DIFFERENTIABLE RENDERING PIPELINE FOR INVERSE GRAPHICS," filed Sep. 6, 2017, the entire content of which is incorporated herein by reference.

FIELD OF THE INVENTION

The present invention relates to computer generated graphics, and more particularly to a differentiable rendering pipeline for inverse graphics.

BACKGROUND

Inverse graphics systems generate a three-dimensional (3D) scene model from one or more images of an observed scene. The 3D scene model may include one or more 3D object models and one or more illumination sources in the observed scene, with a goal of faithfully reproducing object model geometry and scene illumination. Prior art inverse graphics systems typically perform object model generation and optimization using specialized code designed to discern model parameters for a specific class of object, such as a human face or hand. The specialized code is conventionally applicable only to a specific object class, thereby limiting both the adaptability and generality of prior art inverse graphics systems. Thus, there is a need for addressing these issues and/or other issues associated with the prior art.

SUMMARY

A method, computer readable medium, and system are disclosed for inverse graphics rendering. The system is configured to receive image data in a two-dimensional space, determine initial parameter values for geometric primitives in a three-dimensional space, render the geometric primitives, compare the image data and rendered image data to produce differences, and update the initial parameter values based on the differences and the derivatives. In one embodiment, the geometric primitives, when rendered, produce the rendered image data in the two-dimensional space that approximates the image data. In one embodiment, the system renders the geometric primitives by generating a visibility function for each geometric primitive using the initial parameter values, filtering each visibility function to produce corresponding smooth and continuous functions, computing derivatives in the two-dimensional space for each smooth and continuous function, and computing shaded pixel values of the rendered image data based on the smooth and continuous functions.

The method comprises receiving image data in a two-dimensional space, determining initial parameter values for geometric primitives in a three-dimensional space, rendering the geometric primitives, comparing the image data and rendered image data to produce differences, and updating the initial parameter values based on the differences and the derivatives. In one embodiment, the geometric primitives, when rendered, produce the rendered image data in the two-dimensional space that approximates the image data. In one embodiment, rendering the geometric primitives comprises generating a visibility function for each geometric primitive using the initial parameter values, filtering each visibility function to produce corresponding smooth and continuous functions, computing derivatives in the two-dimensional space for each smooth and continuous function, and computing shaded pixel values of the rendered image data based on the smooth and continuous functions.

The computer readable medium includes instructions that, when executed by a processing unit, cause the processing unit to perform the method.

DETAILED DESCRIPTION

Embodiments of the present invention include an inverse graphics system configured to generate 3D scene and/or object models for an observed image. Such models may include parameters that describe arbitrary geometry, lighting, and texturing in the observed image. The inverse graphics system may comprise a rendering pipeline constructed to provide end-to-end differentiability for the parameters, thus allowing efficient use of parameter optimization techniques, such as gradient descent and others.

Visibility is a conventionally discontinuous (non-differentiable) attribute of object geometry processed by a typical prior art rendering pipeline. In one embodiment, visibility is made continuous, and therefore differentiable, using visibility filtering and smoothing. Exemplary filtering and smoothing techniques are described herein. By transforming visibility from being a discontinuous to a continuous attribute, the disclosed rendering pipeline may provide end-to-end differentiability.

Figure 1A:
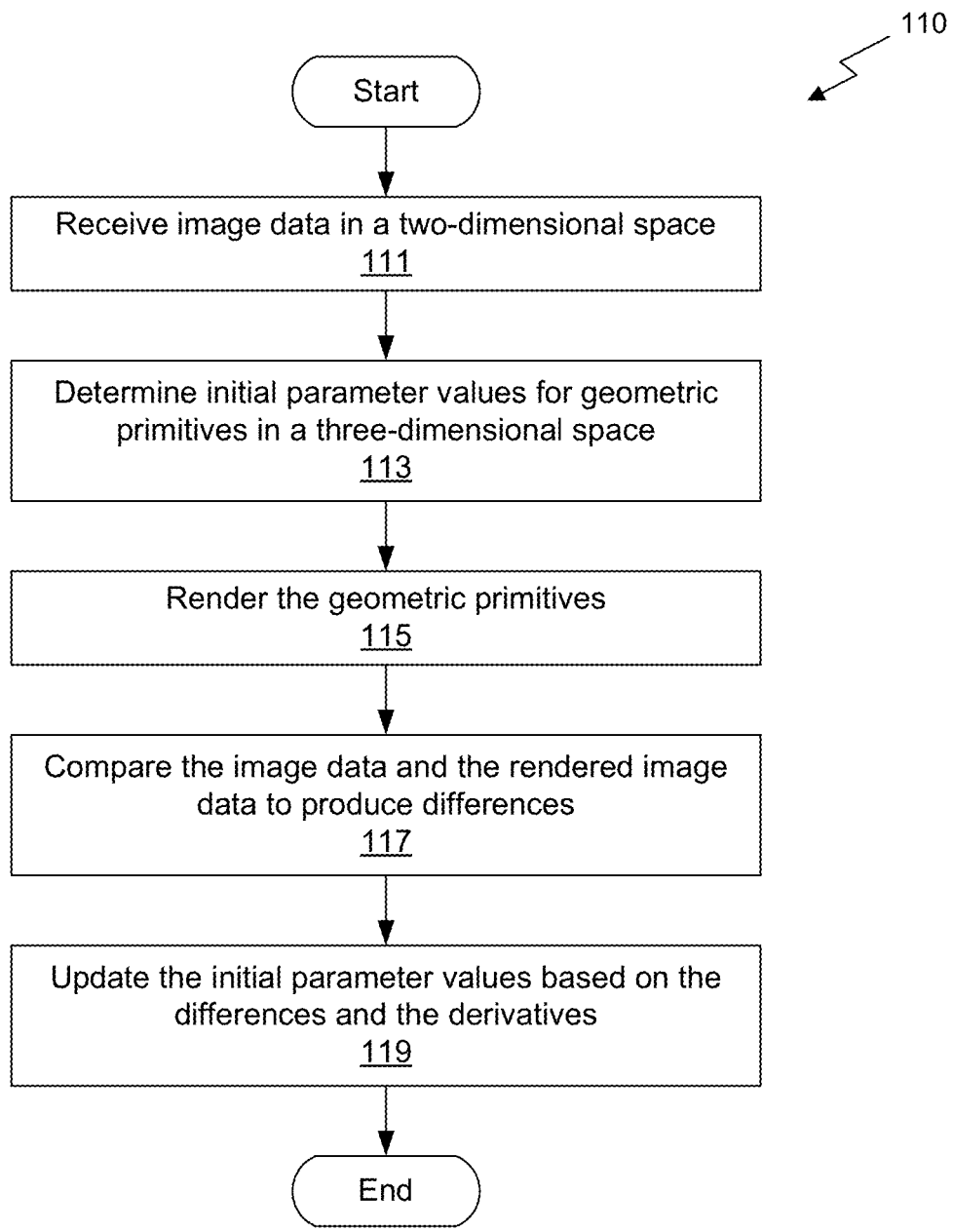
FIG. 1A illustrates a flowchart of a method for updating parameter values in an inverse graphics rendering system, in accordance with one embodiment.

FIG. 1A illustrates a flowchart of a method 110 for updating parameter values in an inverse graphics rendering system, in accordance with one embodiment. Although method 110 is described in the context of a processing unit and/or inverse graphics rendering system, the method 110 may also be performed by a program, custom circuitry, or by a combination of custom circuitry and a program. For example, the method 110 may be executed by a GPU (graphics processing unit), a CPU (central processing unit), or any other technically feasible processor. Furthermore, persons of ordinary skill in the art will understand that any system that performs method 110 is within the scope and spirit of embodiments of the present invention.

In one embodiment, an inverse graphics rendering system comprising the processing unit is configured to perform method 110. Furthermore, the inverse graphics rendering system may include application specific circuitry optimized for performing certain machine leaning operations.

At step 111, the inverse graphics rendering system receives image data in a two-dimensional (2D) space. The image data may include one or more images of an object or a scene comprising one or more objects. At step 113, the inverse graphics rendering system determines initial parameter values for geometric primitives (e.g., triangles) in a three-dimensional (3D) space. When rendered, the geometric primitives produce rendered image data in the two-dimensional space that approximates the image data. Any technically feasible technique may be used to surmise scene geometry using geometric primitives. For example, in one embodiment, scene segmentation is used to surmise the scene geometry. In another embodiment, an object classifier is used to identify and surmise the scene geometry. Any technically feasible technique may be used to determine the initial parameter values for the geometric primitives. In one embodiment, the initial parameters define one or more initial 3D scene and/or object models.

At step 115, the inverse graphics rendering system renders the geometric primitives. The geometric primitives may be rendered based on the initial parameters, with visibility smoothing applied to the geometric primitives. In one embodiment, the geometric primitives are rendered according to steps 122 through 128, described in conjunction with FIG. 1B. Furthermore, derivatives are computed in conjunction with rendering the geometric primitives. In one embodiment, the derivatives are computed in the 2D space.

At step 117, the inverse graphics rendering system compares the image data and the rendered image data to produce differences. The differences comprise a measure of difference between the image data and the rendered image data. In one embodiment, the differences comprise a sum of pixel value differences. For example, each pixel value of the image data may be subtracted from a corresponding pixel value in the rendered image data; and, an absolute value of the difference in each color channel (e.g., red, green, and blue color channels) is accumulated and added together to generate a differences value. Furthermore, different comparison techniques may be implemented without departing the scope and spirit of various embodiments.

At step 119, the inverse graphics rendering system updates the initial parameter values based on the differences and the derivatives. Each parameter value may be updated, for example, according to one or more associated derivatives. In one embodiment, the parameters are updated using gradient descent. In practice, a parameter is updated by nudging the parameter in a direction that reduces or minimizes the error (opposite direction of the gradient of the error). Given a parameter x, the new updated parameter x' may be computed as x−alpha*dD/dx, where D is the difference between the two images (i.e., the differences value) and alpha controls the length of the step for each iteration. The same equation may be applied to all parameters that the user wants to update.

In one embodiment, the steps 115, 117, and 119 are repeated until an iteration count is encountered, or the difference (e.g., the differences value) is reduced according to a specified requirement. The specified requirement may be, for example, a fixed threshold for the differences value, a fixed slope for the differences value, or any other technically feasible criteria for indicating a halt to iterating.

An inverse graphics system may be required to optimize thousands or millions of parameters (e.g., vertex positions for geometric objects and meshes, camera position and attributes, lighting details, and so forth). An optimization framework may be configured to include the rendering pipeline. Furthermore, the optimization framework may perform parameter optimization for inverse graphics using the derivative outputs of the rendering pipeline. In one embodiment, a machine learning framework known in the art as TensorFlow™ may be configured to perform the inverse graphics techniques described herein. Of course, any technically feasible optimization framework may be configured instead to perform the techniques described herein. In one embodiment, the machine learning framework is implemented to include one or more deep neural networks.

Figure 1B:
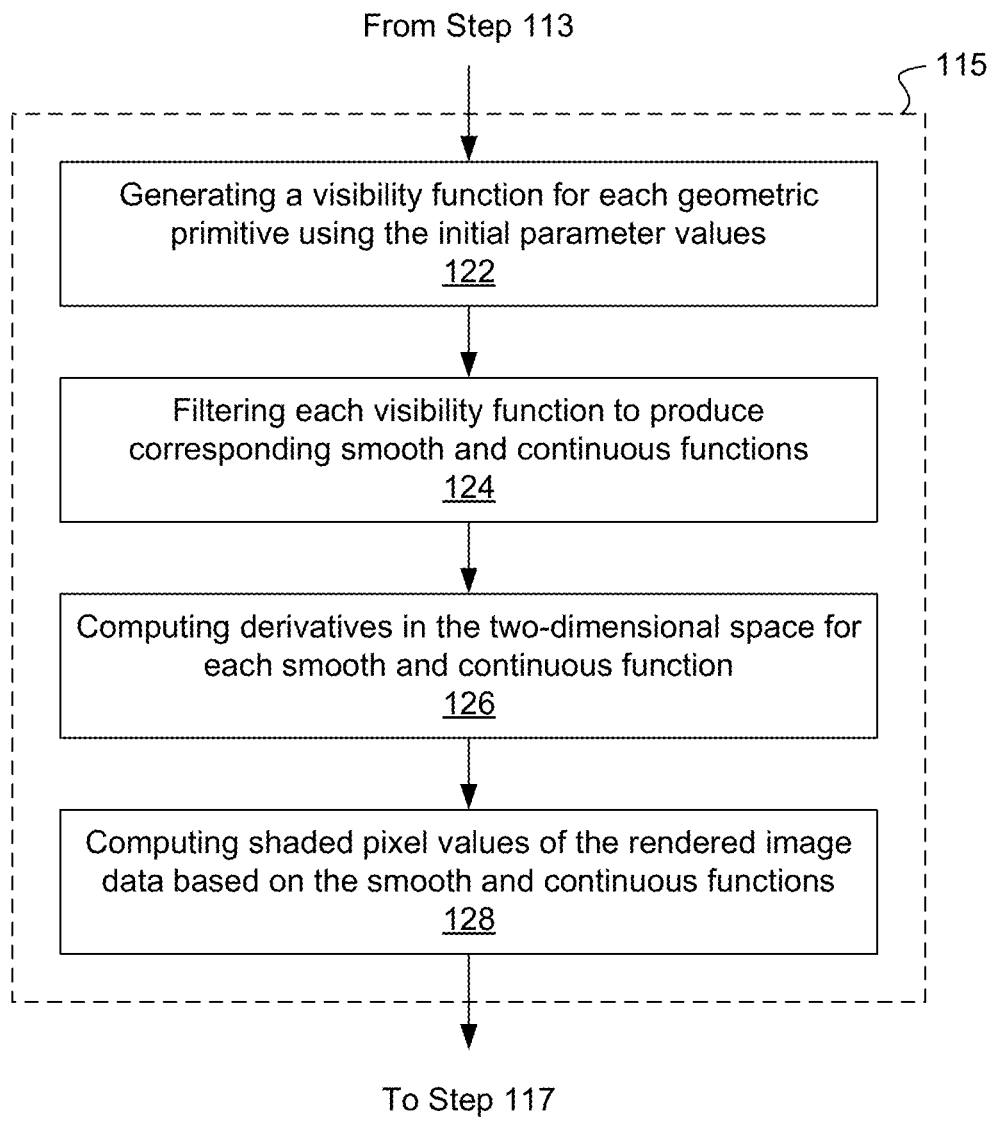
FIG. 1B illustrates a flowchart of a method for rendering geometric primitives in an inverse graphics rendering system, in accordance with one embodiment.

FIG. 1B illustrates a flowchart of method steps 122-128 comprising step 115 of FIG. 1A for rendering geometric primitives in an inverse graphics rendering system, in accordance with one embodiment. Although method steps 122-128 are described in the context of a processing unit and/or inverse graphics rendering system, the method steps 122-128 may also be performed by a program, custom circuitry, or by a combination of custom circuitry and a program. For example, the method steps 122-128 may be executed by a GPU, CPU, or any other technically feasible processor. Furthermore, persons of ordinary skill in the art will understand that any system that performs method steps 122-128 is within the scope and spirit of embodiments of the present invention.

At step 122, the inverse graphics rendering system generates a visibility function for each geometric primitive using the initial parameter values. A given visibility function includes samples of primitive visibility. At step 124, the inverse graphics rendering system filters each visibility function to produce corresponding smooth and continuous functions. In one embodiment, derivatives of the visibility functions are non-zero at edges of the geometric primitives. In general, filtering a given visibility function produces a corresponding smooth and continuous visibility function, which is both differentiable and non-zero at the edges of an associated geometric primitive. In one embodiment, at each point (e.g., a pixel location), filtering comprises computing a weighted average of a surrounding neighborhood through integration/summation. Furthermore, when two geometric primitives (e.g., triangles) share a common edge, the derivatives of the visibility functions for the two geometric primitives sum to zero at the shared edge. In a triangle mesh, a given triangle may share all three edges, and the derivatives of the visibility functions sum to zero at the three edges.

In one embodiment, filtering comprises applying a filter having a width of a single pixel to each visibility function. Note that over-filtering with a filter spanning multiple pixels may cause blurring in a rendered image, while under-filtering with a filter that is smaller than a pixel may produce spurious derivatives.

At step 126, the inverse graphics rendering system computes derivatives in the two-dimensional space for each smooth and continuous function. In one embodiment, the derivatives indicate whether a given parameter should be increased or decreased to reduce differences between reference image data and the rendered image data.

At step 128, the inverse graphics rendering system computes shaded pixel values of the rendered image data based on the smooth and continuous functions. In one embodiment, the smooth and continuous functions (continuous visibility) are used to evaluate a continuous expectation of coverage at a given sample point. By converting a conventionally discontinuous visibility function for geometric primitives into a smooth and continuous visibility function, stochastic shading is of the primitives is made continuous and therefore differentiable. In this way, both geometry and shading of the geometry is made differentiable in the context of stochastic (e.g., sub-pixel sampled) shading.

Figure 1C:
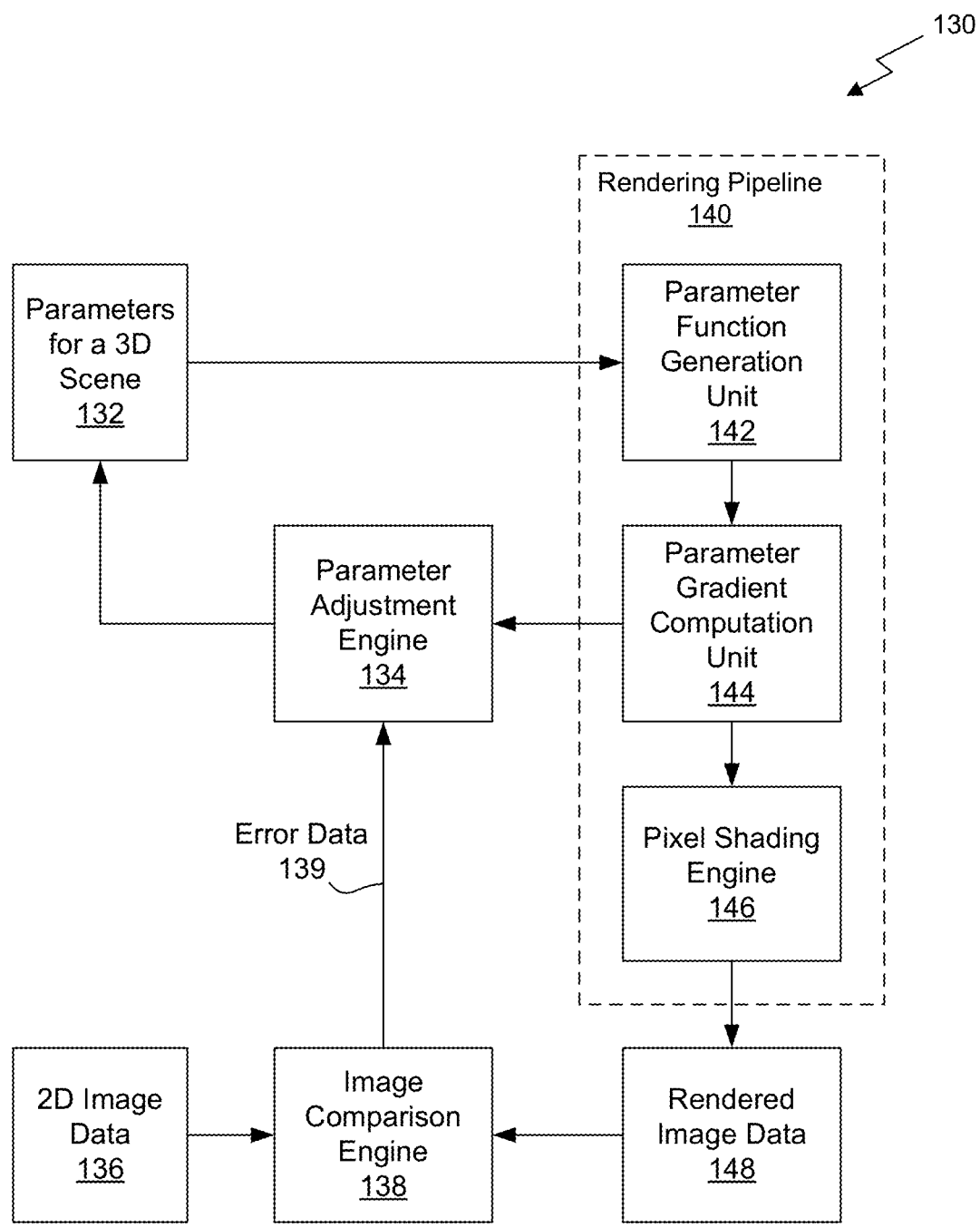
FIG. 1C illustrates an inverse graphics rendering system, in accordance with one embodiment.

FIG. 1C illustrates an inverse graphics rendering system 130, in accordance with one embodiment. As shown, the inverse graphics rendering system 130 includes a rendering pipeline 140, configured to receive parameters for a 3D scene 132 and generate a rendered image data 148, based on the parameters for a 3D scene 132. The rendered image data 148 may include a rendered 2D image. In one embodiment, the rendering pipeline 140 comprises a differentiable rendering pipeline configured to generate both rendered pixel values from the parameters for a 3D scene 132 and gradients of the rendered pixel values with respect to the parameters for a 3D scene 132. The rendering pipeline 140 includes a parameter function generation unit 142, a gradient computation unit 144, and a pixel shading engine 146. Image comparison engine 138 compares a reference or observed image comprising 2D image data 136 with the rendered image 148 to generate error data 139. The error data 139 provides a quantitative measure (e.g., the differences value) of differences between the 2D image data 136 and the rendered image data 148. A parameter adjustment engine 134 is configured optimize and update the parameters for a 3D scene 132 based on parameter gradients from the parameter gradient computation unit 144 and the error data 139.

The inverse graphics rendering system 130 may be implemented as programming instructions for a processing unit, custom circuitry, or a combination thereof. For example, the inverse graphics rendering system 130 may be implemented as programming instructions for a GPU, CPU, or any other technically feasible processor.

In one embodiment, the rendering pipeline is constructed to include a portion of automatically generated differentiation code. An automatic differentiation system may be used to generate the differentiation code. In practice, the rendering pipeline may include manually written source code comprising output variables calculated from input variables. The automatic differentiation system receives the manually written source code, analyzes the source code, and generates the differentiation code to include derivative outputs corresponding to the output variables. The chain rule of differentiation may be applied in the differentiation code to provide end-to-end derivative outputs. Any technically feasible techniques may be performed by the automatic differentiation system to generate the differentiation code.

During normal operation, the inverse rendering system 130 receives 2D image data 136 and determines initial values for parameters for a 3D scene 132. The initial values are determined to produce rendered image data 148 as an approximation of the 2D image data 136. The rendering pipeline 140 receives the parameters for a 3D scene 132 and a parameter function generation unit 142 generates one or more functions for the parameters. Some functions, such as visibility (i.e., coverage) are piecewise linear functions from which useful (i.e., non-zero) gradients cannot be computed. The parameter function generation unit 142 then filters each visibility function to produce smooth and continuous functions. Filtering may also soften edges for antialiasing. The filtered visibility functions are smooth and continuous, and therefore can be used to compute useful derivatives of the parameters.

The inverse rendering system 130 may perform multiple iterations of optimizing, updating, and rendering the parameters for a 3D scene 132, with the goal of sequential iterations causing corresponding generated rendered image data 148 to converge to the 2D image data 136. This process of optimization may cause parameters for a 3D scene 132 to more closely model actual scene and object geometry depicted in the 2D image data 136. In one embodiment, the parameters for a 3D scene 132 are optimized (e.g., trained) by the parameter adjustment engine 134 using a gradient descent or any other derivative-based optimization technique based on the error data and the parameter derivatives. Note that a cost-function may be defined to quantify a degree of parameter optimization, with the cost function serving to guide the optimization process. In certain embodiments, parameter adjustment engine 134 includes one or more neural networks, configured to extract features of input images and use the extracted features to optimize the parameters for a 3D scene 132. For example, the parameter adjustment engine 134 may be configured to optimize the parameters for a 3D scene 132 to perform style transfer operations from one image to a rendered image, as described in greater detail in conjunction with FIG. 2C.

Figure 1D:
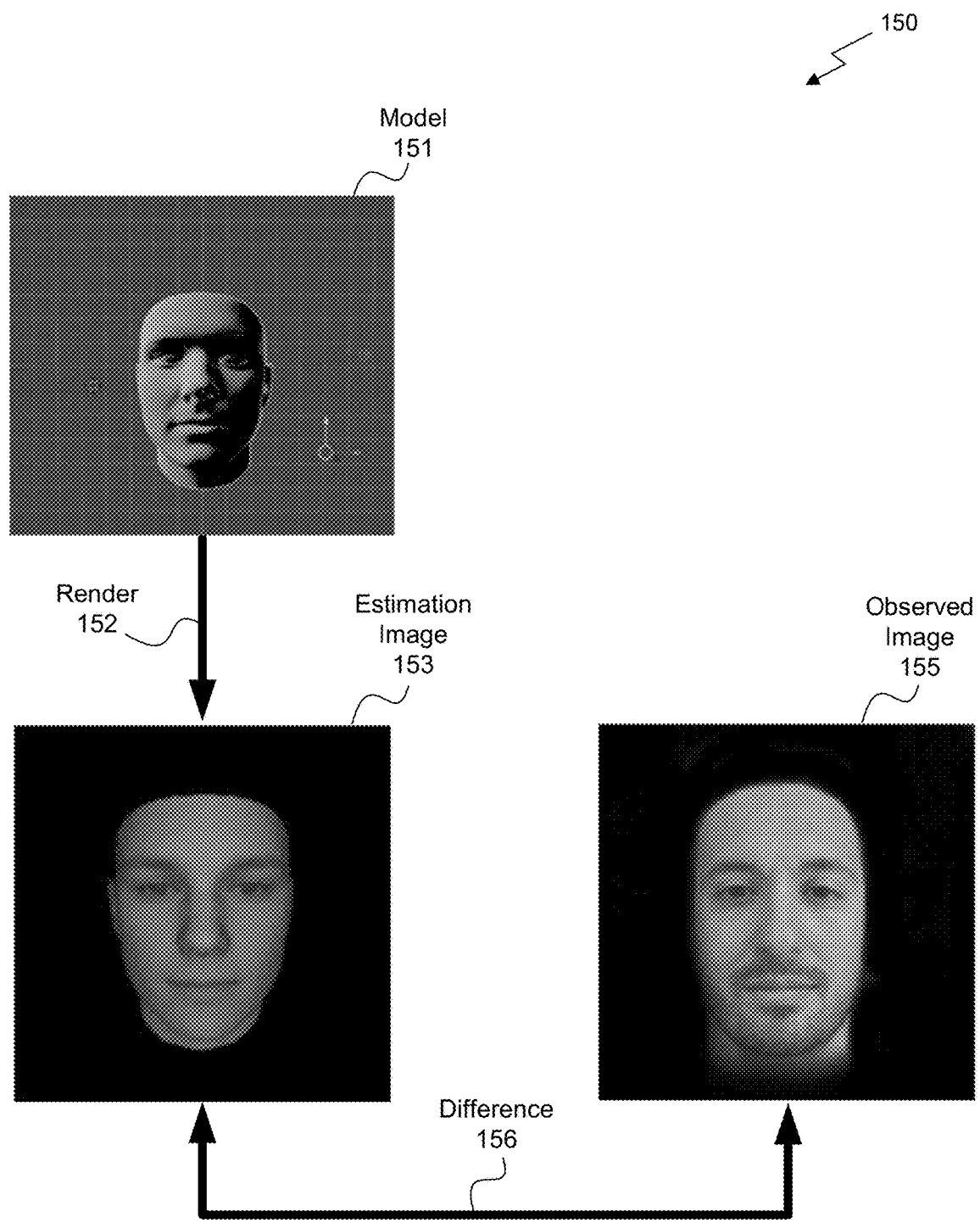
FIG. 1D illustrates a process for calculating a difference between a rendered estimation and an observed image, in accordance with one embodiment

FIG. 1D illustrates a process 150 for calculating a difference 156 between a rendered estimation image 153 and an observed image 155, in accordance with one embodiment. As shown, a model 151 is rendered 152 to generate an estimation image 153. The model 151 includes object and/or scene geometry and may include lighting information. In one embodiment, the model 151 is described by the parameters for a 3D scene 132. The difference 156 provides a quantitative measure of how closely estimation image 153 matches (or mismatches) the observed image 155. In one embodiment, a partial derivative is calculated of the difference 156 with respect to a given parameter in the model 151. The partial derivative can be used to determine whether the model parameter should be increased or decreased to reduce the difference 156. Because the rendering pipeline is differentiable, each model parameter may be independently optimized in a given optimization iteration to reduce the difference 156. In one embodiment, the difference 156 comprises error data 139.

Figure 1E:
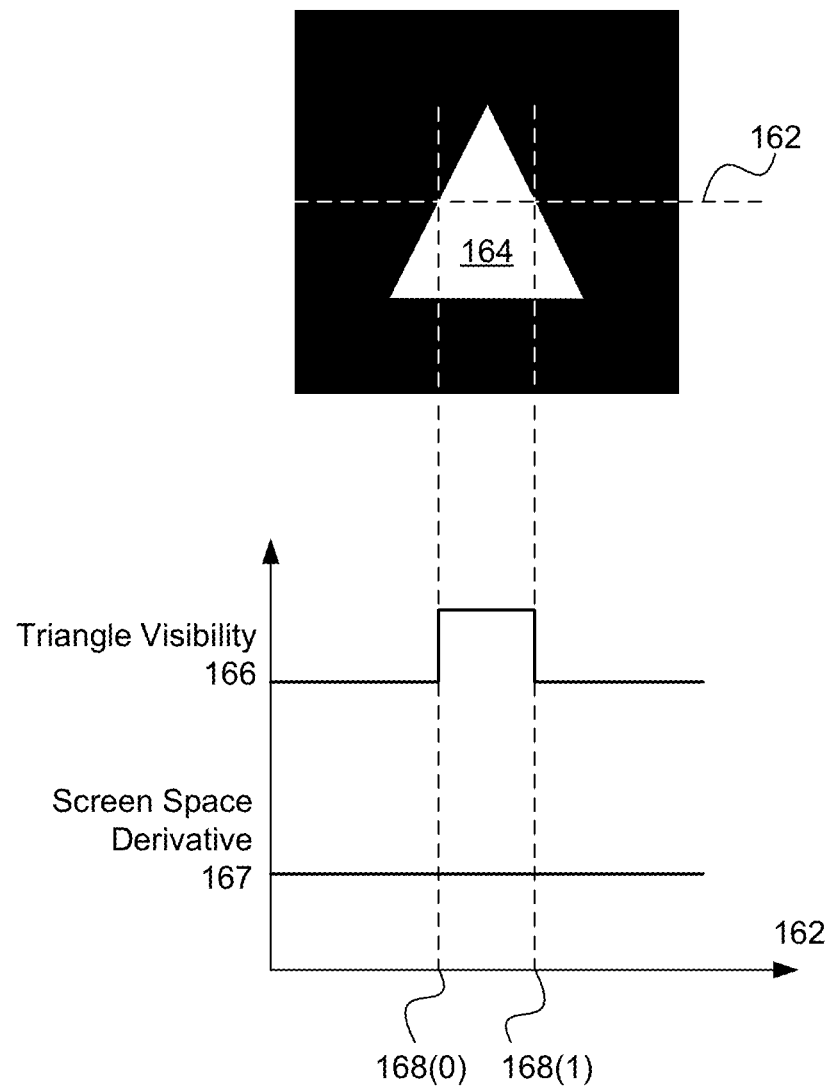
FIG. 1E illustrates triangle visibility and a corresponding screen space derivative along an arbitrary line in screen space, according to the prior art.

FIG. 1E illustrates triangle visibility 166 and a corresponding screen space derivative 167 along an arbitrary line 162 in screen space, according to the prior art. As shown, line 162 intersects triangle 164 at intersection points 168(0) and 168(1). The triangle visibility 166 is a differentiable function almost everywhere in screen space. However, actually calculating the derivative of triangle visibility 166 will yield a value of zero (where valid). A constant derivative value of zero provides no useful information for optimization techniques that rely on derivative information to guide optimization. This deficiency in the prior art can be addressed using the techniques described herein, and in particular with respect to FIGS. 1F and 1G.

Figure 1F:
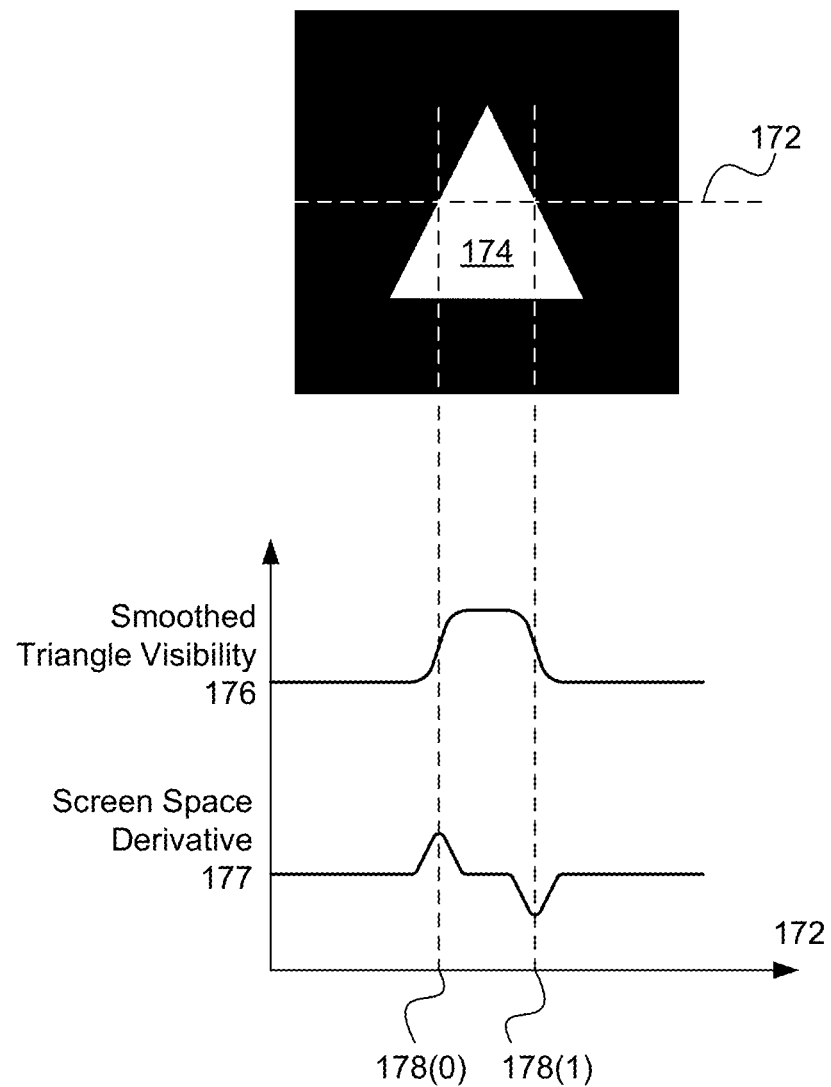
FIG. 1F illustrates smoothed triangle visibility and a corresponding screen space derivative along an arbitrary line in screen space, in accordance with one embodiment.

FIG. 1F illustrates smoothed triangle visibility 176 and a corresponding screen space derivative 177 along an arbitrary line 172 in screen space, in accordance with one embodiment. Line 172 intersects triangle 174 at intersection points 178(0) and 178(1). As shown, the triangle visibility 176 has been filtered and smoothed, leading to continuously differentiable, non-zero screen space derivative 177 at intersection points 178(0) and 178(1). More generally, the sharp, discontinuous edge of a conventional binary visibility function is replaced with a filtered and smoothed visibility function, thereby providing continuous, non-zero derivatives at the edge of geometric objects (e.g., intersection points 178). In one embodiment, filtering and smoothing is performed at step 115 of method 110 (e.g., step 124 of FIG. 1B). A width of a falloff region may be controlled to be one-pixel in extent to avoid introducing visually apparent blurring in rendered images.

Figure 1G:
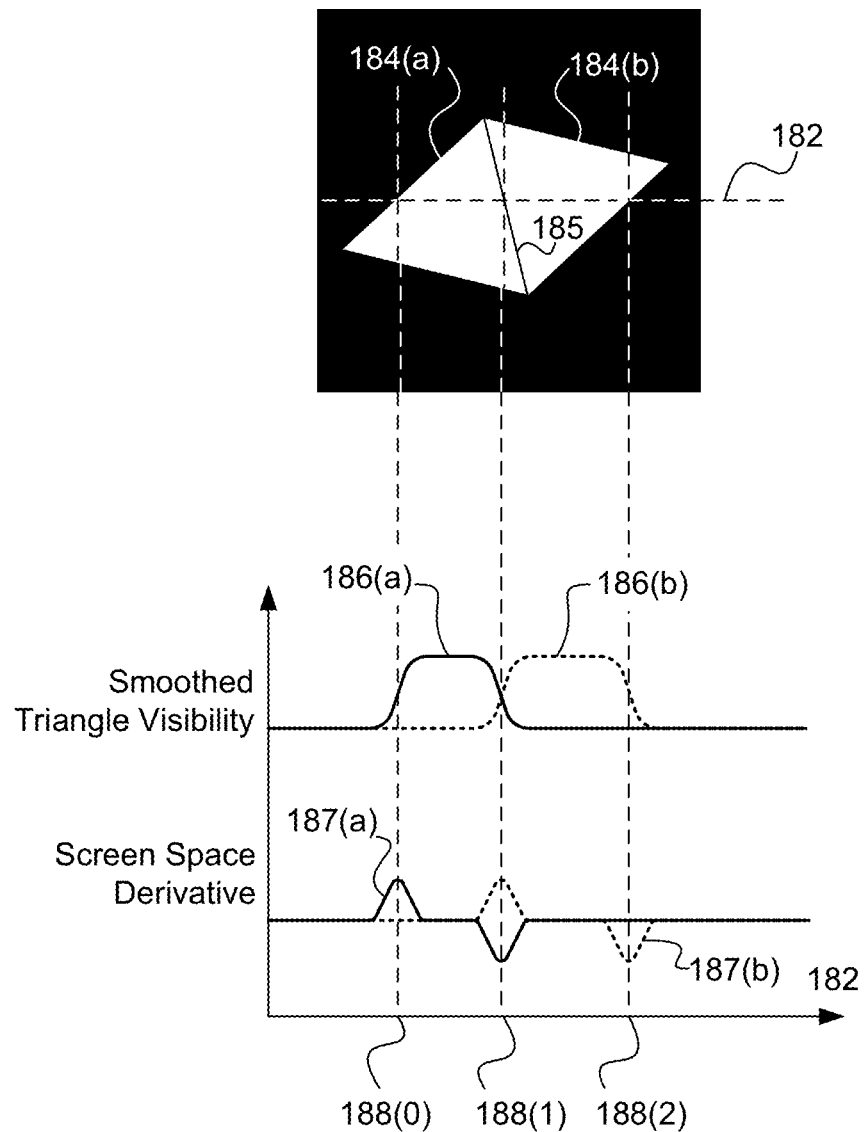
FIG. 1G illustrates smoothed visibility for abutting triangles and corresponding screen space derivatives along an arbitrary line in screen space, in accordance with one embodiment.

FIG. 1G illustrates smoothed visibility 186 for abutting triangles 184 and corresponding screen space derivatives 187 along an arbitrary line 182 in screen space, in accordance with one embodiment. As shown, two triangles 184(a) and 184(b) share a common edge 185. Functions for smoothed triangle visibility 186(a) and 186(b) exhibit a smooth falloff at intersection points 188(0), 188(1), 188(2). More generally, visibility at respective edges of triangles 184(a) and 184(b) exhibit a smooth falloff. Smoothed triangle visibility 186(a) has a corresponding screen space derivative 187(a), and smoothed triangle visibility 186(b) has a corresponding screen space derivative 187(b). As shown, screen space derivative 187(a) is continuous and non-zero around intersection point 188(0) and 188(1). Similarly, screen space derivative 187(b) is continuous and non-zero around intersection point 188(1) and 188(2). To avoid making seems and edges visible, smoothed triangle visibility 186(a) and smoothed triangle visibility 18b(b) are configured to sum to zero where they abut, such as at and around intersection point 188(1).

In one embodiment, a pixel filter that implements a convolution function is configured to perform filtering and smoothing. For each pixel (i.e., point) on a rendered geometric object, a weighted average is calculated in a surrounding neighborhood. In regions of constant visibility surrounding a pixel, a constant result is produced. However, at edges, a smooth falloff is produced, allowing for a continuous, non-zero derivative.

Figure 1H:
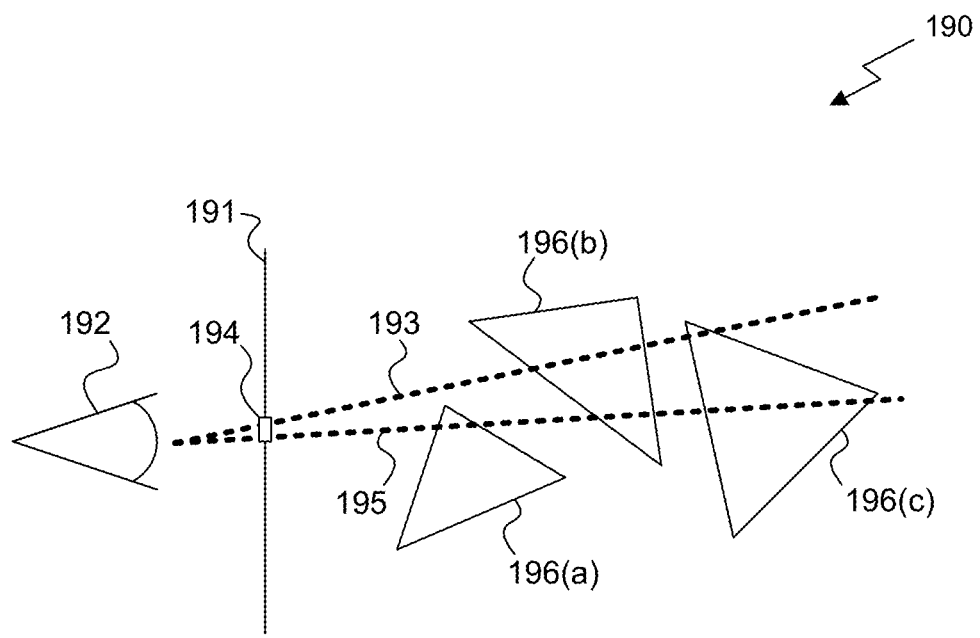
FIG. 1H illustrates approximating visibility for overlapping triangles, in accordance with one embodiment.

FIG. 1H illustrates approximating visibility for overlapping triangles, in accordance with one embodiment. A scene configuration 190 includes a camera 192 at a camera position, and triangles 196 within view of the camera 192. As shown, triangles 196(a) and 196(b) are directly visible to camera 192 within a filter region 194, while triangle 196(c) is occluded by triangles 196(a) and 196(b). The filter region 194 comprises a region within a screen space 191. The filter region 194 is bounded by projections 193 and 195 from camera 192 into the scene configuration 190. In one embodiment, the filter region 194 is aligned to a single pixel in the screen space 191. That is, the width and height of filter region 194 is equal to the respective width and height of a single pixel. In alternative embodiments, the filter region 194 may be larger or smaller than a single pixel in screen space 191. A pixel filter function is configured to sample the filter region 194 to calculate visibility and shading contributions for triangles 196 based on coverage of each triangle 196.

In one embodiment, geometric primitives (e.g., triangles 196) are sorted, and occluded portions discarded prior to generating visibility functions for the geometric primitives. Sorting may be according to depth or coverage. For example, triangles 196(a), 196(b), and 196(c) may be sorted, with triangle 196(b) discarded prior to calculating visibility functions in filter region 194. In certain embodiments, a visibility function is approximated by adding together coverage of different triangles visible within a given pixel until a threshold (e.g. one) is reached; visibility contributions for remaining triangles are not included for the pixel. The visibility functions may be used to determine shading contributions for the geometric primitives.

In one embodiment, the pixel filter function is configured to sample a plurality of sample points within a region of an associated pixel. A coverage contribution for different triangles at a given sample point may be calculated using a continuous, differentiable visibility function for each triangle. In this way, slight changes in camera position, triangle parameters, and/or other scene parameters produce differentiable outputs, which may be used for gradient descent optimization. In certain embodiments, the differentiable outputs may include shaded pixels having different color contributions from two or more different triangles, with continuous, differentiable visibility functions for the two or more different triangles.

In one embodiment, visibility functions for different triangles may be modeled as continuous probabilities, and shading for a given pixel intersecting two or more triangles may be calculated as an expectation function based on the probabilities. For example, in a scenario with two triangles contributing to a pixel, a first triangle may have a color A and a second triangle may have a color B. Coverage for the first and second triangle is modeled as respective probabilities p and 1−p. Shading contributions for the two triangles may be calculated using an expectation function $E[f]=Ap+B(1-p)$. That is, the first triangle contributes a proportion p of color A and the second triangle contributes a proportion 1−p of color B to a final pixel color.

Conventional visibility functions are defined to include a discontinuity separating visible and non-visible portions, making such functions difficult to use for optimization functions. By contrast, an expectation function of continuous probabilities is differentiable with respect to any scene parameter, thereby providing gradients used for optimization operations.

Figure 2A:
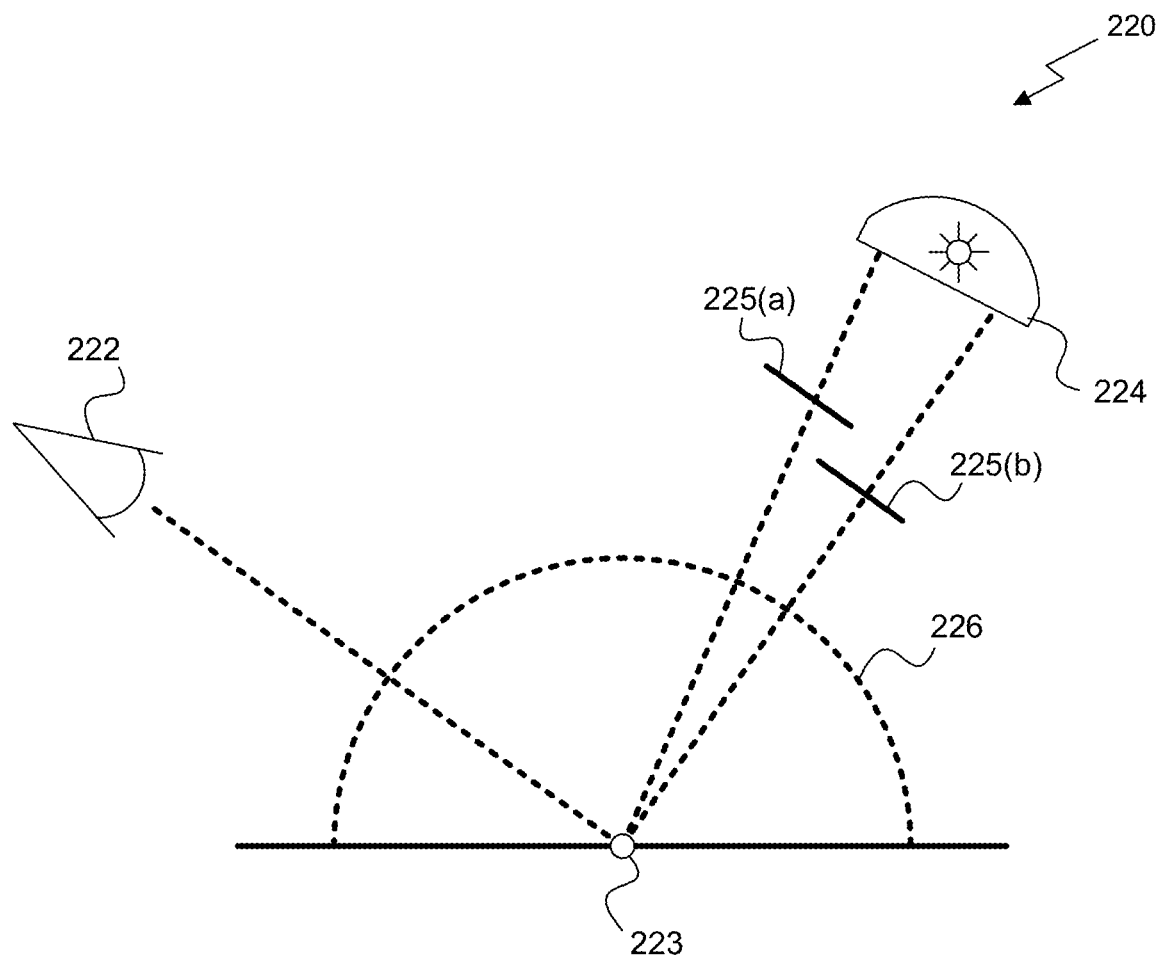
FIG. 2A illustrates determining parameters for a shadow within a scene, in accordance with one embodiment.

FIG. 2A illustrates determining parameters for a shadow within a scene, in accordance with one embodiment. A scene configuration 220 includes a camera 222 at a camera position, and a surface point 223 within a projection hemisphere 226. The surface point 223 is within view of the camera 220. An illuminator 224 is configured to serve as a light source within the scene configuration 220, with illumination blockers 225(a) and 225(b) placing the surface point 223 in shadow to a varying extent. An illumination blocker 225 comprises a primitive, such as a geometric primitive, disposed between an illuminator and a given surface point being rendered. More generally, illuminators and illumination blockers may be configured according to scene parameters, with light projected from the illuminators to the surface point 223 through projection hemisphere 226 to yield an illumination result for the surface point 223 at camera 222. Illumination results for the surface point 223 remain differentiable with respect to scene parameters as no discontinuities are introduced during rendering. In one embodiment, the scene parameters are calculated according to gradient descent techniques, based on gradients of the scene parameters with respect to the surface point 223. The parameter values may be refined through a plurality of iterations.

Figure 2B:
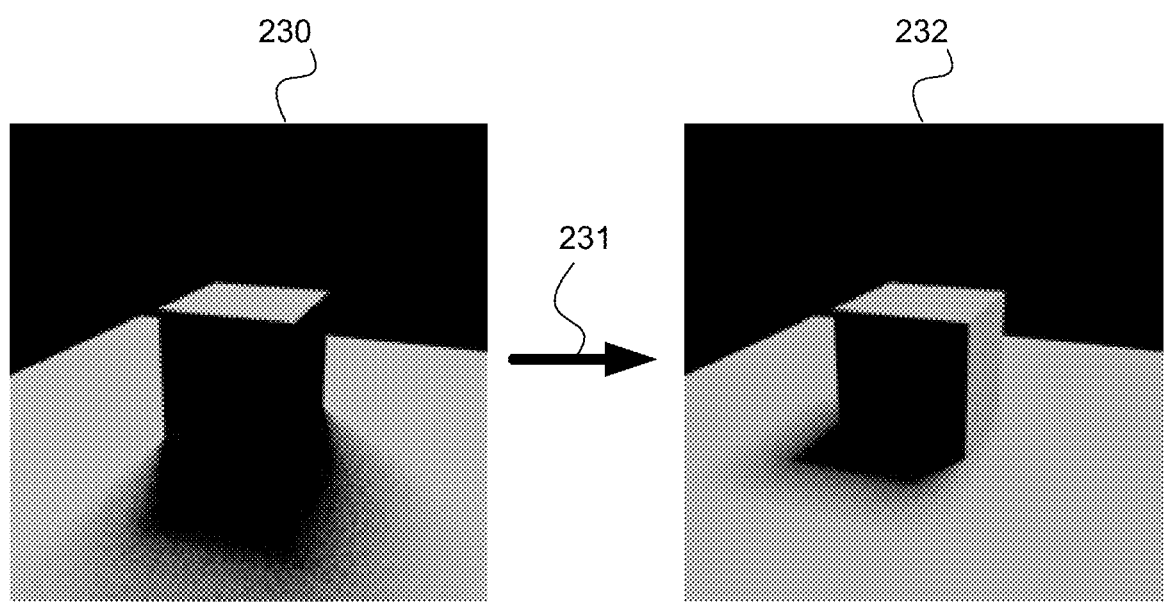
FIG. 2B illustrates a technique for shadow modeling, in accordance with one embodiment.

FIG. 2B illustrates a technique for shadow modeling, in accordance with one embodiment. An initial estimated scene 230 may be optimized 231 by, for example, moving an illuminator (not shown) in the scene to match the shadow case within a target scene 232. In one embodiment, techniques discussed with respect to FIG. 2A may be applied to provide scene parameter optimization to reposition the illuminator. In one embodiment, a modeling tool is configured to position one or more illuminators according to a target shadow shape and/or position.

Figure 2C:
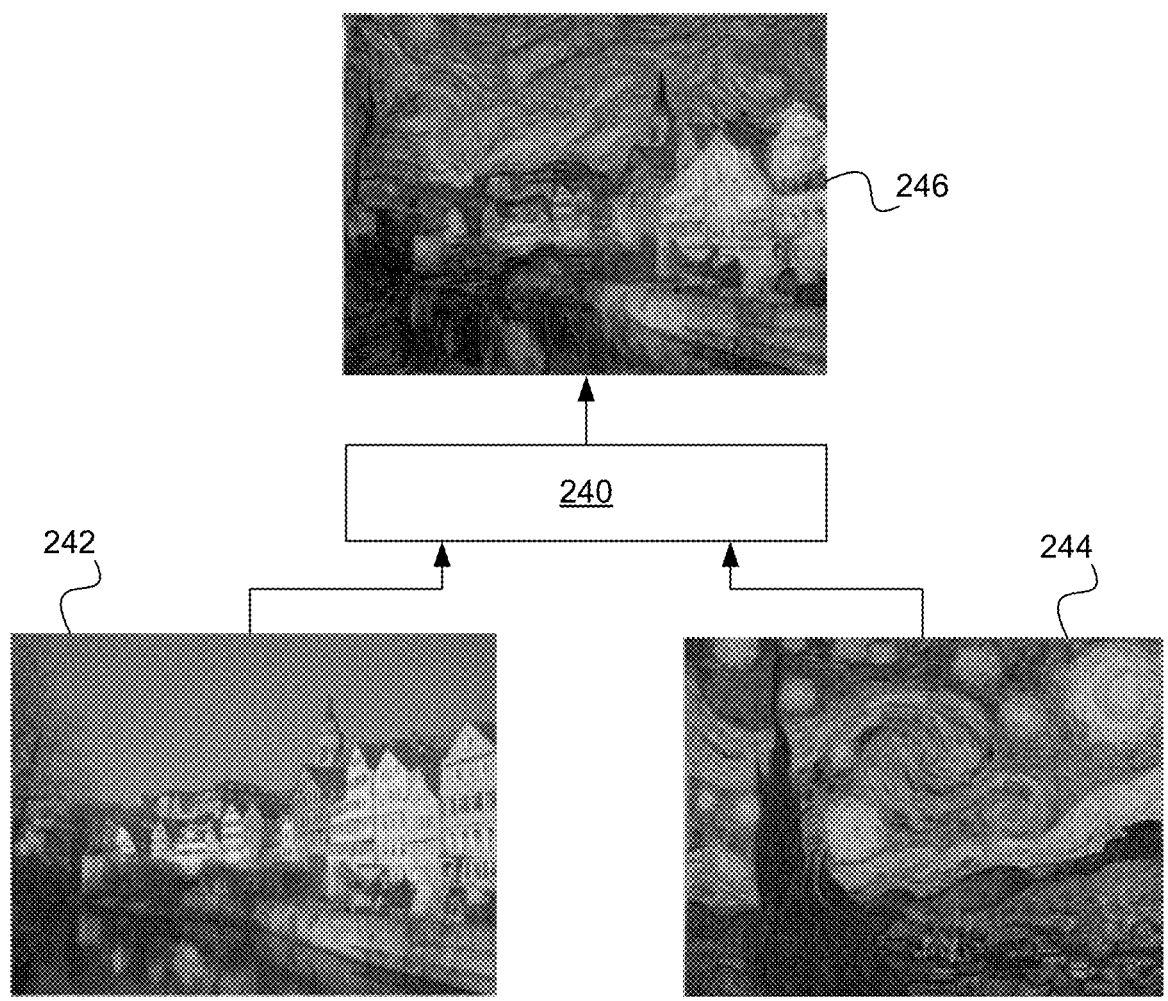
FIG. 2C illustrates a technique for style transfer, in accordance with one embodiment.

FIG. 2C illustrates a technique for style transfer, in accordance with one embodiment. In various embodiments, matching scene parameters is the optimization goal rather than optimizing pixel values against a target image. Exemplary scene parameters may include vertices, light color, light position, material glossiness, and the like. In style transfer, a reference image 242 and a style image 244 are combined 240 to generate a stylized image 246 having salient features of the reference image (e.g., geometry), while rendered according to the style image. In one example, initial parameters may correspond to parameter values for geometric primitives in a three-dimensional space (e.g., from reference image 242) and image data may comprise the style image 244. Optimization may proceed according to the techniques described herein, and in particular according to method 110 and/or method 260.

In one embodiment, this optimization may be similar to other neural network style transfer techniques. For example, a scene may be rendered with a resulting image presented to a first convolutional neural network (CNN) configured for image recognition. In one embodiment the CNN comprises a deep neural network, as described herein. Intermediate responses of the CNN are sampled to generate first feature vectors. The style image is presented to a second CNN similarly configured for image recognition, with intermediate responses sampled to generate second feature vectors. The feature vectors may be interpreted to be a high-dimensional embedding of each image. Alternatively, the feature vectors may be interpreted to be non-linear frequency decompositions. The CNN layers (intermediate responses) that produce edge and texture responses of respective images may be extracted as the feature vectors. In one embodiment, the image data (e.g. of method 110) is replaced with the first feature vectors and the rendered image data is replaced with the second feature vectors before the image data is compared with the rendered image data to produce the differences. An exemplary style transfer optimization attempts to transfer edges and textures (i.e., high frequency details of the style image) to the reference image. In one embodiment, the first CNN and the second CNN are implemented within the parameter adjustment engine 134 of FIG. 1C.

Figure 2D:
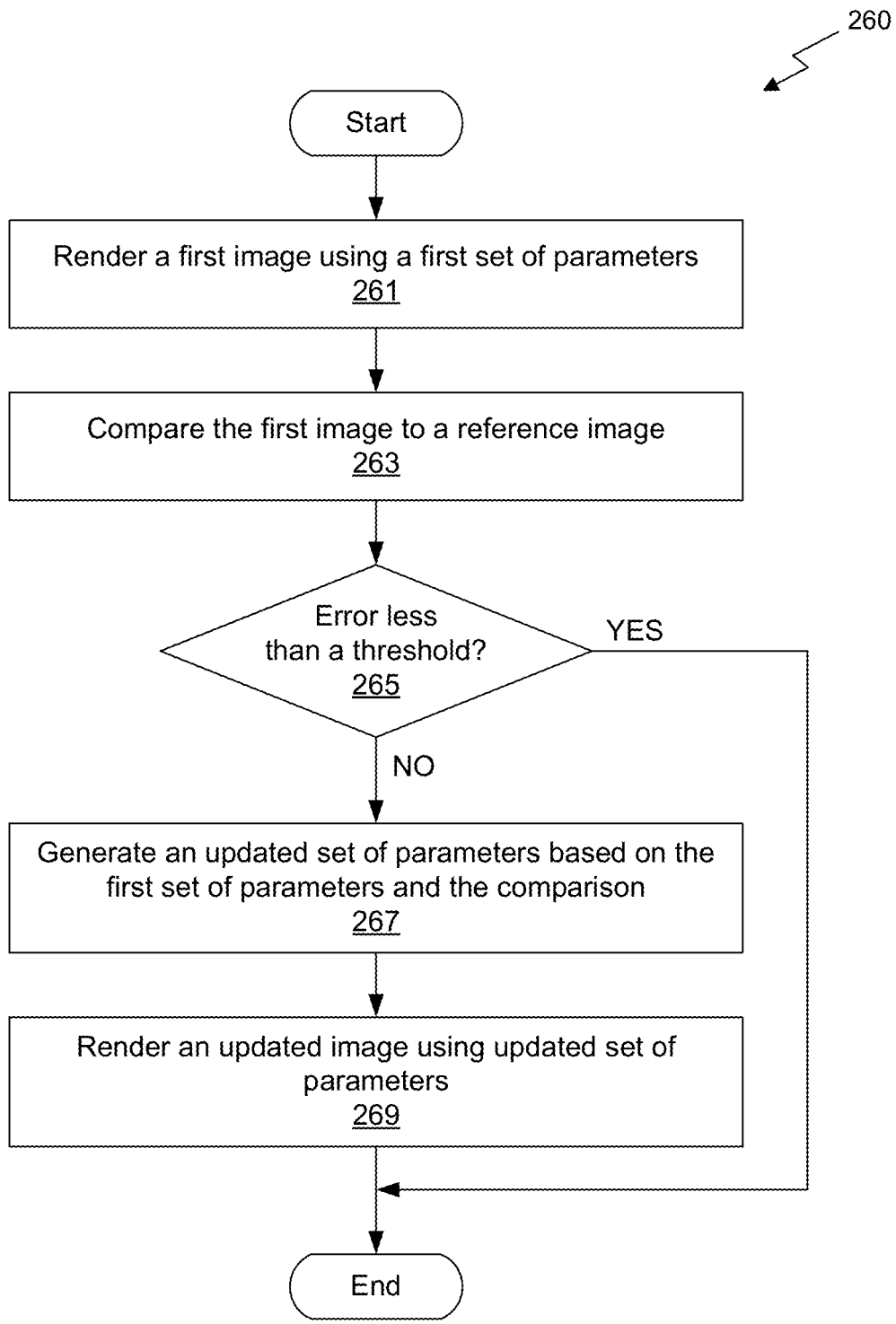
FIG. 2D illustrates a flowchart of a method for iteratively generating a set of model parameter values in an inverse graphics rendering system, in accordance with one embodiment.

FIG. 2D illustrates a flowchart of a method 260 for iteratively generating a set of model parameter values in an inverse graphics rendering system, in accordance with one embodiment. Although method 260 is described in the context of a processing unit and/or inverse graphics rendering system, the method 260 may also be performed by a program, custom circuitry, or by a combination of custom circuitry and a program. For example, the method 260 may be executed by a GPU (graphics processing unit), a CPU (central processing unit), or any other technically feasible processor. Furthermore, persons of ordinary skill in the art will understand that any system that performs method 260 is within the scope and spirit of embodiments of the present invention.

In one embodiment, the inverse graphics rendering system 130 comprising rendering pipeline 140 is configured to perform method 260. Furthermore, the inverse graphics rendering system 130 may include application specific circuitry optimized for performing certain machine leaning operations.

At step 261, the inverse graphics rendering system 130 renders a first image using a first set of parameters. In one embodiment, rendering is performed on a differentiable rendering pipeline (e.g., rendering pipeline 140) using parameters for a 3D scene 132. At step 263, the inverse graphics rendering system 130 compares the first image (e.g., rendered image data 148) to a reference image (e.g., 2D image data 136). In one embodiment, comparing the first image and the second image is performed by comparison engine 138. The result of the comparison may be an error value (e.g., the differences value, the error data 139) indicating a difference between the first image and the second image.

If, at step 265, the error is not less than a specified threshold, then the method 260 proceeds to step 267, where the inverse graphics rendering system 130 generates an updated (e.g., second, third, and so forth) set of parameters based on the first set of parameters and the comparison of the first image and the reference image. In one embodiment, the updated set of parameters is generated by the parameter adjustment engine 134. At step 269, the inverse graphics rendering system 130 renders an updated image using an updated set of parameters. In one embodiment, the rendering pipeline 140 is configured to render the update image, comprising an updated version of the rendered image data 148. Returning to step 267, if the error is less than the specified threshold, then the method terminates.

In one embodiment, upon completing step 269, the method proceeds back to iterate one or more times through steps 263-269 until the specified threshold is met. At each iteration, the set of parameters are updated based on a previous set of parameters and a newly updated image is rendered for comparison to the reference image. At each iteration, an updated image is compared to the reference image in step 263. Furthermore, in step 267 the updated set of parameters is based on a previous set of parameters, initially comprising the first set of parameters. The parameters may include geometric primitive information, shading information, position information, texture information, camera position information, illuminator position information, and the like.

Figure 2E:
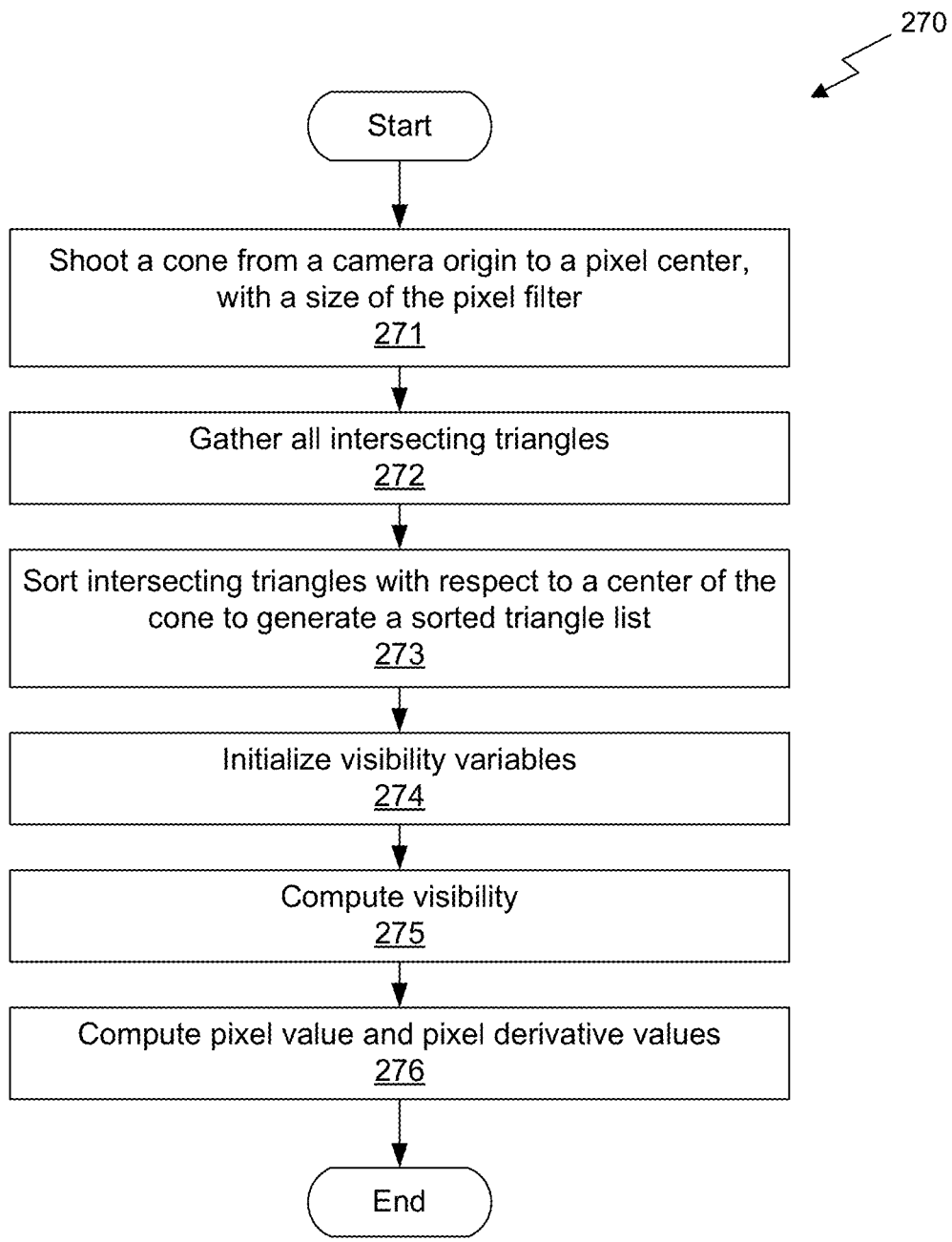
FIG. 2E illustrates a flowchart of a method for rendering a pixel in a scene, in accordance with one embodiment.

FIG. 2E illustrates a flowchart of a method 270 for rendering a pixel in a scene, in accordance with one embodiment. Although method 270 is described in the context of a processing unit and/or inverse graphics rendering system, the method 270 may also be performed by a program, custom circuitry, or by a combination of custom circuitry and a program. For example, the method 270 may be executed by a GPU (graphics processing unit), a CPU (central processing unit), or any other technically feasible processor. Furthermore, persons of ordinary skill in the art will understand that any system that performs method 270 is within the scope and spirit of embodiments of the present invention.

In one embodiment, the inverse graphics rendering system 130 is configured to perform method 270. Method 270 may be repeated for each pixel within a given graphics scene to render the scene. In one embodiment, method 270 may implement step 261 and/or step 269 of method 260.

At step 271, the inverse graphics rendering system 130 shoots (i.e., projects) a cone from a camera origin to a pixel center, with the size of a pixel center. At step 272, the inverse graphics rendering system 130 gathers all intersecting triangles (i.e., triangles that intersect the cone). At step 273, the inverse graphics rendering system 130 sorts the intersecting triangles with respect to a center of the cone to generate a sorted triangle list. Steps 271-273 are illustrated in FIG. 1H, according to certain embodiments. At step 274, the inverse graphics rendering system 130 initializes visibility variables. For example, a visibility variable may be set to zero (e.g., visibility=0) and a list of triangle visibility values may be set to zero (e.g., triangle_visibilities={ }). At step 275, the inverse graphics rendering system 130 computes visibility. At step 276, the inverse graphics rendering system 130 computes a pixel value and pixel derivative (gradient) values. In one embodiment, step 275 is performed according to the pseudo-code of Table 1. In one embodiment, the convolve( ) function called in the pseudo-code of Table 1 provides a smoothed visibility function, as illustrated in FIGS. 1F and 1G. In certain embodiments, step 276 is performed according to the pseudo-code of Table 2.

TABLE 1

For each intersecting triangle in sorted triangle list:
    triangle_visibility = convolve(triangle, pixel filter)
    // Clamp if the visibility sums to more than 1
    if visibility + triangle_visibility >= 1:
        triangle_visibility = 1 − visibility
    triangle_visibilities.append(triangle, triangle_visibility)
    visibility = visibility + triangle_visibility
    // Cull the triangles if visibility >= 1
    if visibility >= 1:
        break

TABLE 2

For each sample:
    Shoot a ray inside the pixel filter, hit triangle t at point p
    color = shade(camera origin, p)
    d_loss / d_color is given by the back-propagation
    // To propagate the gradients through discrete sampling
    // $f(p\_0, p\_1, ...) = C\_0$ with prob $p\_0$, $C\_1$ with prob $p\_1$, ...
    // $E[f] = p\_0\ C\_0 + p\_1\ C\_1 ...$
    // $dE[f]/dp\_i = C\_i$
    // $df/dp = C\_i / p$ with prob $p\_i$
    d_color / d_triangle_visibilities[t] = color / triangle_visibilities[t]

Figure 2F:
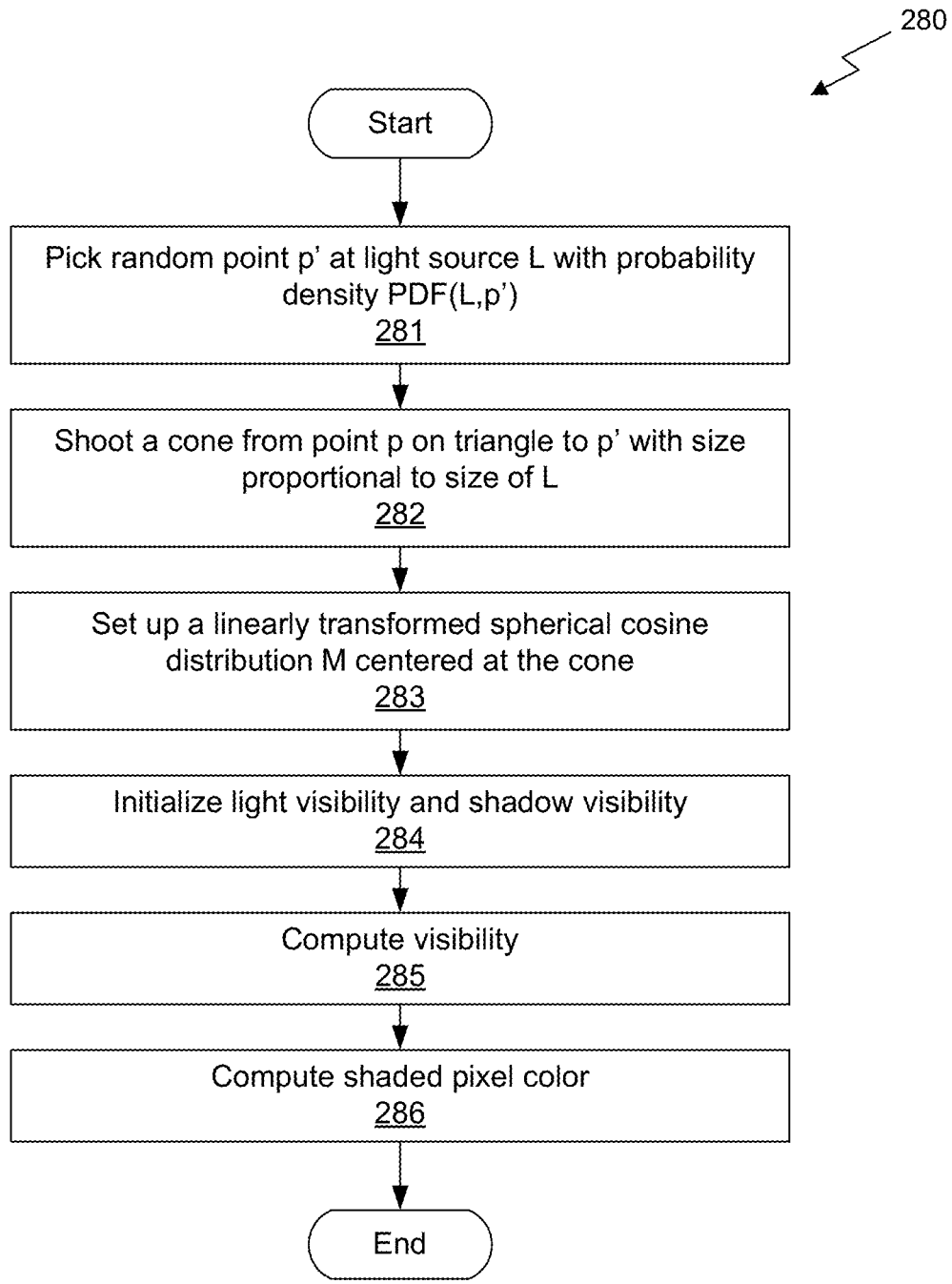
FIG. 2F illustrates a flowchart of a method for shading a pixel, in accordance with one embodiment.

TABLE 2-continued back propagate d_triangle_visibilities[t] to all variables depending
        on it with automatic differentiation
    back propagate d_color to all variables depending on it with
        automatic differentiation
done FIG. 2F illustrates a flowchart of a method 280 for shading a pixel, in accordance with one embodiment. Although method 280 is described in the context of a processing unit and/or inverse graphics rendering system, the method 280 may also be performed by a program, custom circuitry, or by a combination of custom circuitry and a program. For example, the method 280 may be executed by a GPU (graphics processing unit), a CPU (central processing unit), or any other technically feasible processor. Furthermore, persons of ordinary skill in the art will understand that any system that performs method 280 is within the scope and spirit of embodiments of the present invention.

In one embodiment, the inverse graphics rendering system 130 is configured to perform method 280. In one embodiment, method 280 implements the shade( ) call of the pseudo-code of Table 2.

At step 281, the inverse graphics rendering system 130 picks a random point p' at a light source L with a probability density function based on p' and L. At step 282, the inverse graphics rendering system 130 shoots a cone from point p on a triangle to p' with a size proportional to a size of L. At step 282, the inverse graphics rendering system 130 sets up a linearly transformed cosine distribution M centered at the cone. At step 284, the inverse graphics rendering system 130 initializes light visibility (light_visibility=0) and shadow visibility (shadow_visibility=0). At step 285, the inverse graphics rendering system 130 computes visibility for the pixel. At step 286, the inverse graphics rendering system 130 computes a shaded pixel color for the pixel. In one embodiment, step 285 is performed according to the pseudo-code of Table 3. In certain embodiments, step 286 is performed according to the pseudo-code of Table 4.

TABLE 3

For each triangle intersected with cone
    triangle_visibility = convolve(triangle, M)
    if triangle in L:
        light_visibility = light_visibility + triangle_visibility
    else:
        shadow_visibility = shadow_visibility + triangle_visibility
        // Cull the triangles if visibility >= 1
        if shadow_visibility >= 1:
            break
    visibility = max(1 − shadow_visibility, 0) * min(light_visibility, 1)
done

TABLE 4

// Geometry term
G(o, p, p') = abs(cos(normal(p), (p'−p) / | |p'−p| |) * cos(normal(p'),
    (p'−p) / | |p'− p| |)) / | |p'−p| |^2
// Shaded color = BRDF * light intensity * geometry term * visibility
return brdf(o, p, p') * intensity(L) * G(o, p, p') * visibility More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

Figure 3:
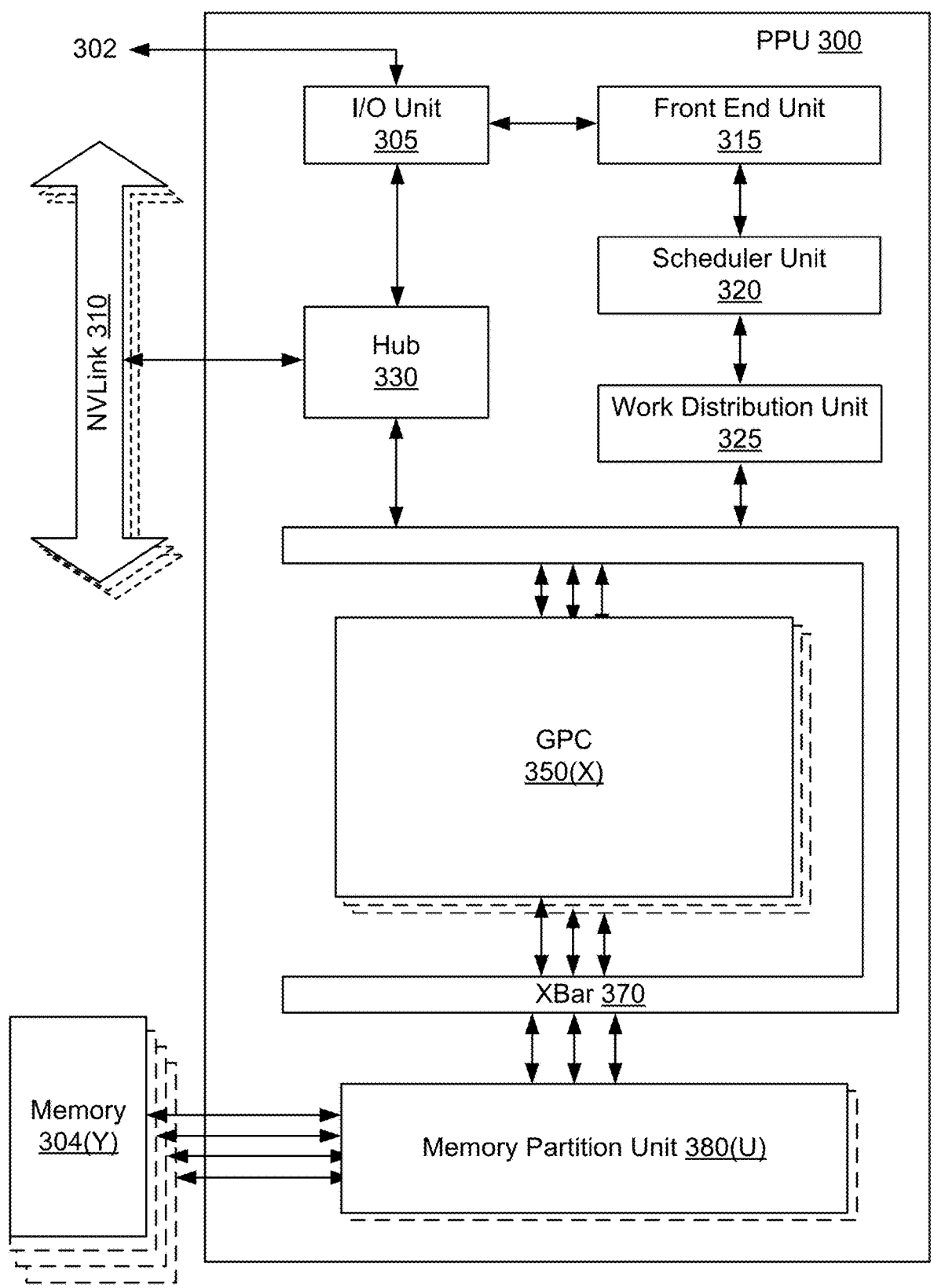
FIG. 3 illustrates a parallel processing unit, in accordance with one embodiment.

FIG. 3 illustrates a parallel processing unit (PPU) 300, in accordance with one embodiment. In one embodiment, the PPU 300 is a multi-threaded processor that is implemented on one or more integrated circuit devices. The PPU 300 is a latency hiding architecture designed to process many threads in parallel. A thread (i.e., a thread of execution) is an instantiation of a set of instructions configured to be executed by the PPU 300. In one embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same. In one embodiment, one or more PPUs 300 are configured to implement the inverse graphics rendering system 130. For example, one or more PPUs 300 may be configured to implement each function of the inverse graphics rendering system 130 using programming instructions (e.g., one or more threads), configurable hardware circuits, custom hardware circuits, or a combination thereof.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In one embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (i.e., commands, data, etc.) from a host processor (not shown) over the interconnect 302. The I/O unit 305 may communicate with the host processor directly via the interconnect 302 or through one or more intermediate devices such as a memory bridge. In one embodiment, the I/O unit 305 may communicate with one or more other processors, such as one or more the PPUs 300 via the interconnect 302. In one embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In one embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In one embodiment, a program executed by the host processor encodes a command stream in a buffer that provides workloads to the PPU 300 for processing. A workload may comprise several instructions and data to be processed by those instructions. The buffer is a region in a memory that is accessible (i.e., read/write) by both the host processor and the PPU 300. For example, the I/O unit 305 may be configured to access the buffer in a system memory connected to the interconnect 302 via memory requests transmitted over the interconnect 302. In one embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In one embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. The results can be transmitted to another PPU 304 or CPU via the NVLink 310. In one embodiment, the PPU 300 includes a number U of partition units 380 that is equal to the number of separate and distinct memory devices 304 coupled to the PPU 300. A partition unit 380 will be described in more detail below in conjunction with FIG. 4B.

In one embodiment, a host processor executes a driver kernel that implements an application programming interface (API) that enables one or more applications executing on the host processor to schedule operations for execution on the PPU 300. In one embodiment, multiple compute applications are simultaneously executed by the PPU 300 and the PPU 300 provides isolation, quality of service (QoS), and independent address spaces for the multiple compute applications. An application may generate instructions (i.e., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In one embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
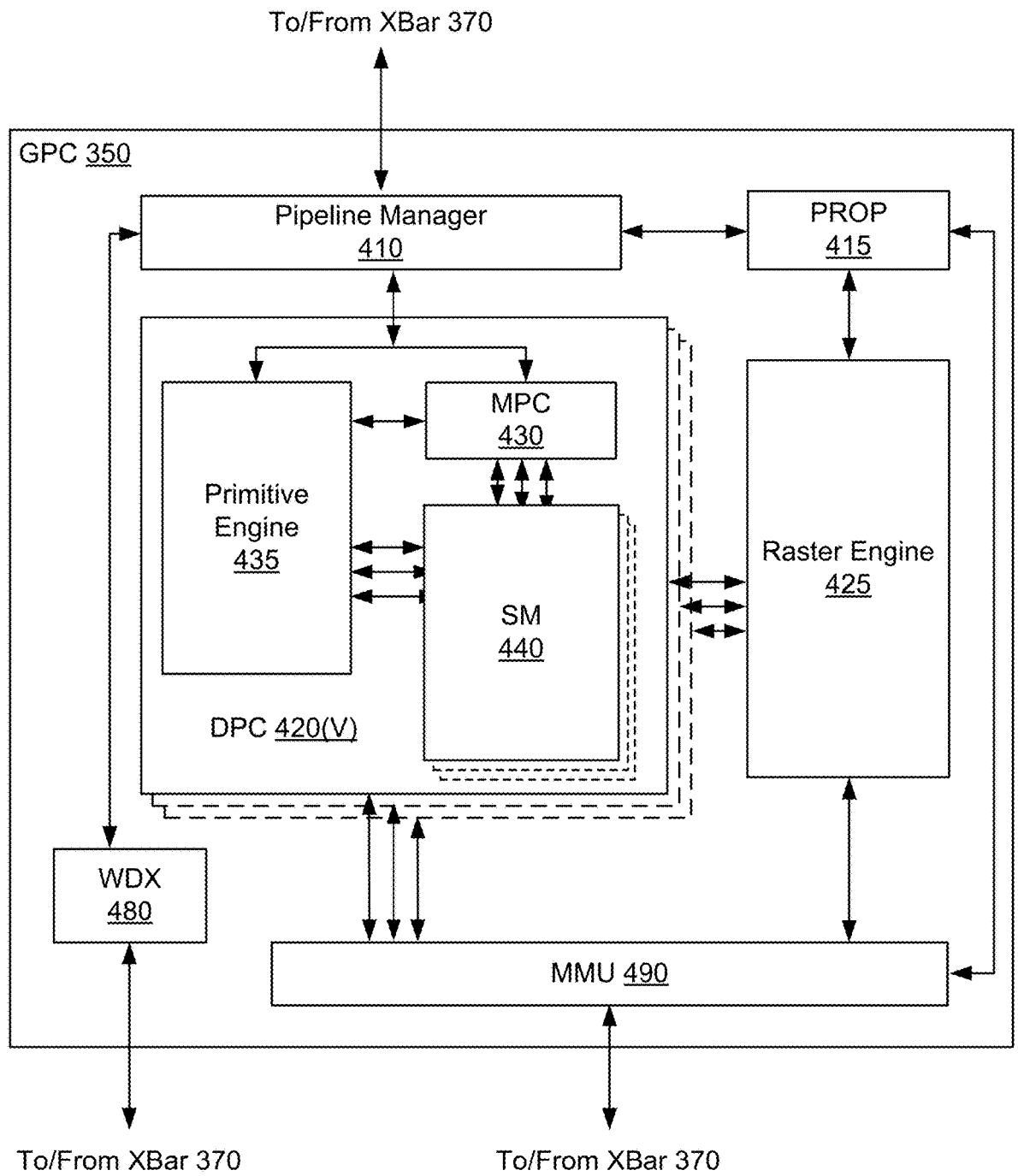
FIG. 4A illustrates a general processing cluster within the parallel processing unit of FIG. 3, in accordance with one embodiment.

FIG. 4A illustrates a GPC 350 of the PPU 300 of FIG. 3, in accordance with one embodiment. As shown in FIG. 4A, each GPC 350 includes a number of hardware units for processing tasks. In one embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In one embodiment, the operation of the GPC 350 is controlled by the pipeline manager 410. The pipeline manager 410 manages the configuration of the one or more DPCs 420 for processing tasks allocated to the GPC 350. In one embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In one embodiment, the pipeline manager 410 may configure at least one of the one or more DPCs 420 to implement a neural network model and/or a computing pipeline.

Figure 4B:
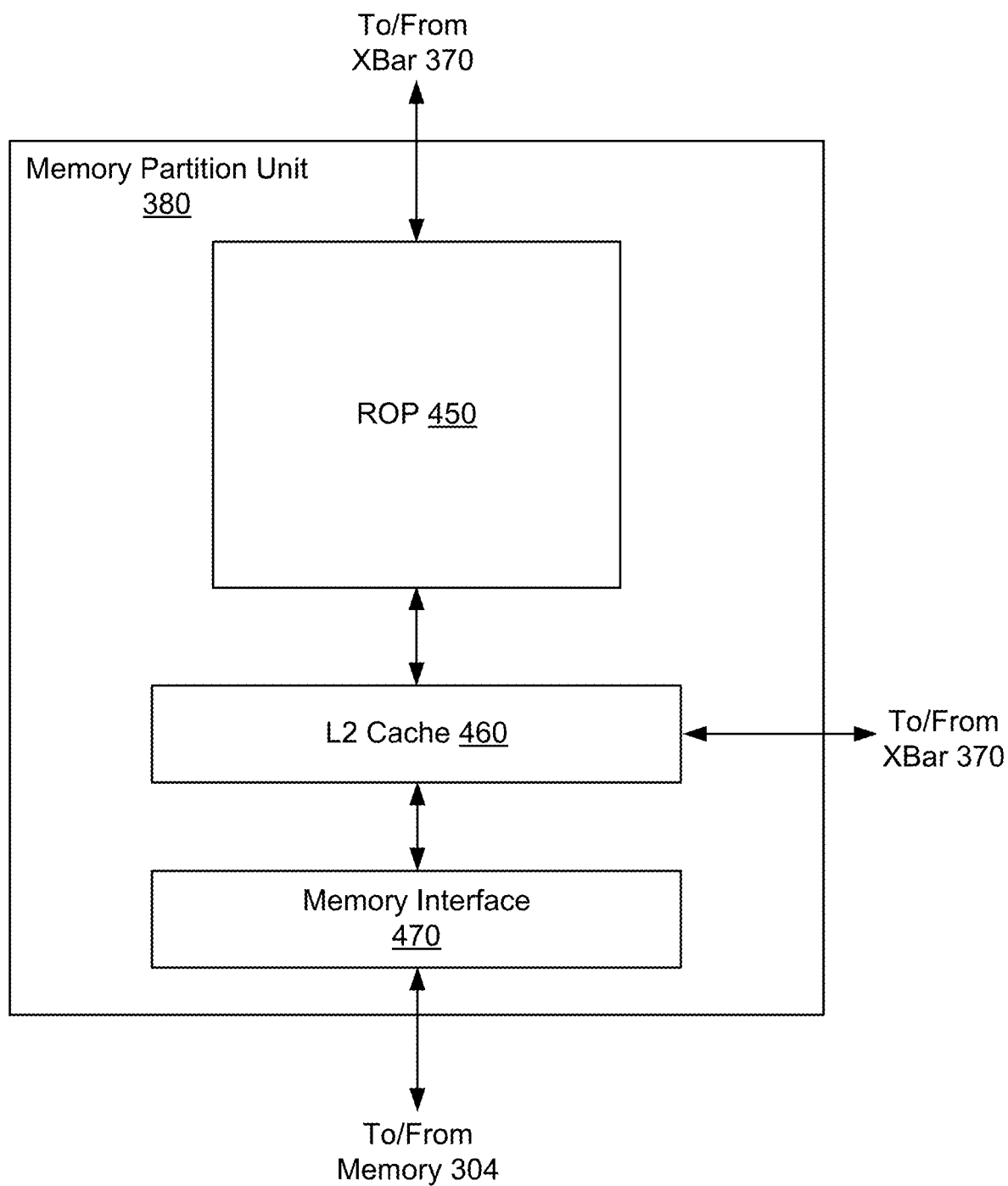
FIG. 4B illustrates a memory partition unit of the parallel processing unit of FIG. 3, in accordance with one embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In one embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In one embodiment, the SM 440 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In one embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the partition unit 380. The MMU 490 may provide translation of virtual addresses into physical addresses, memory protection, and arbitration of memory requests. In one embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with one embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In one embodiment, the PPU 300 incorporates U memory interfaces 470, one memory interface 470 per pair of partition units 380, where each pair of partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In one embodiment, the memory interface 470 implements an HBM2 memory interface and Y equals half U. In one embodiment, the HBM2 memory stacks are located on the same physical package as the PPU 300, providing substantial power and area savings compared with conventional GDDR5 SDRAM systems. In one embodiment, each HBM2 stack includes four memory dies and Y equals 4, with HBM2 stack including two 128-bit channels per die for a total of 8 channels and a data bus width of 1024 bits.

In one embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In one embodiment, the PPU 300 implements a multi-level memory hierarchy. In one embodiment, the memory partition unit 380 supports a unified memory to provide a single unified virtual address space for CPU and PPU 300 memory, enabling data sharing between virtual memory systems. In one embodiment the frequency of accesses by a PPU 300 to memory located on other processors is traced to ensure that memory pages are moved to the physical memory of the PPU 300 that is accessing the pages more frequently. In one embodiment, the NVLink 310 supports address translation services allowing the PPU 300 to directly access a CPU's page tables and providing full access to CPU memory by the PPU 300.

In one embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
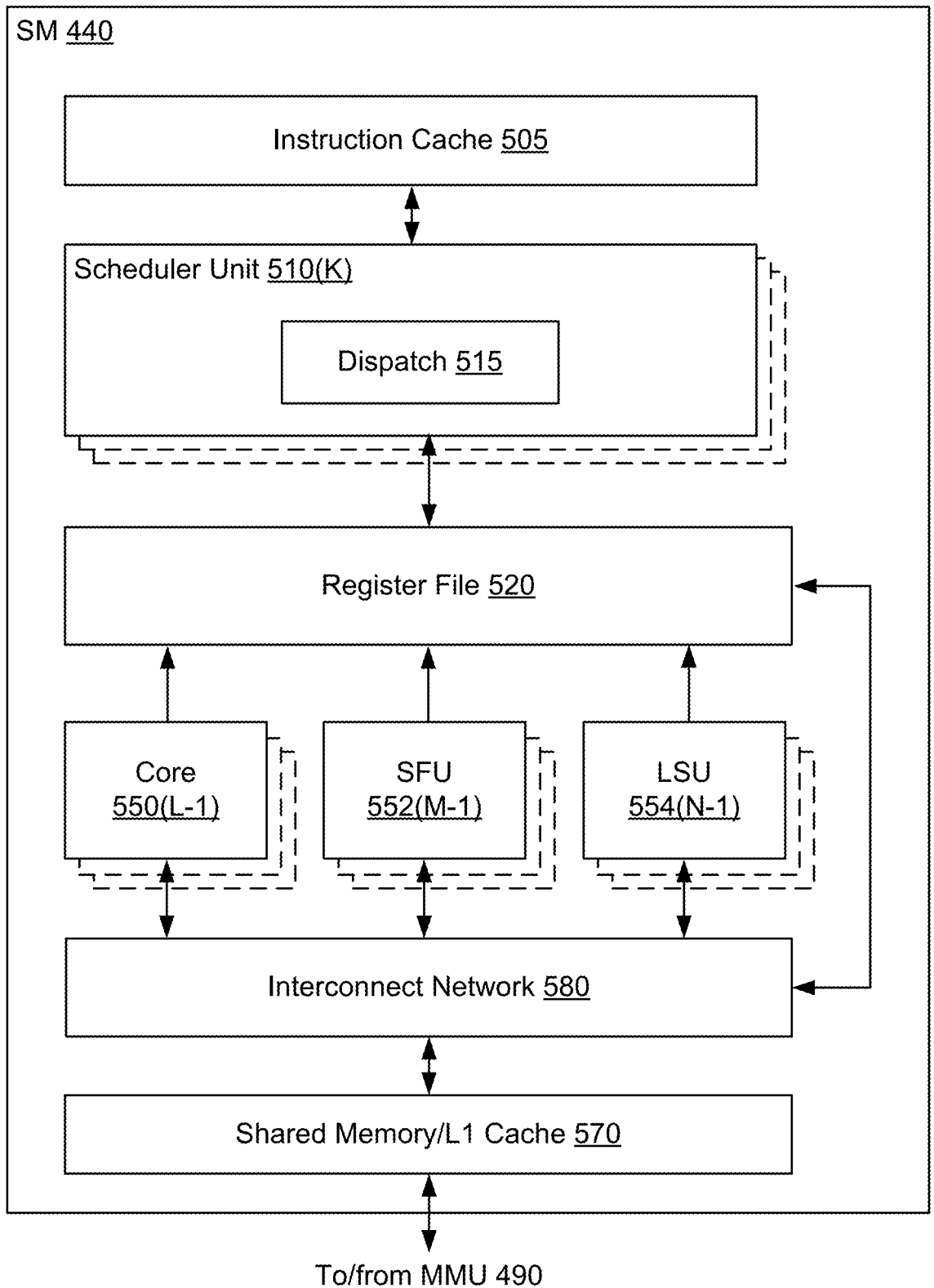
FIG. 5A illustrates the streaming multi-processor of FIG. 4A, in accordance with one embodiment.

FIG. 5A illustrates the streaming multi-processor 440 of FIG. 4A, in accordance with one embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In one embodiment, each warp executes 32 threads. The scheduler unit 510 may manage a plurality of different thread blocks, allocating the warps to the different thread blocks and then dispatching instructions from the plurality of different cooperative groups to the various functional units (i.e., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In one embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In one embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In one embodiment, the floating point arithmetic logic units implement the IEEE 754-2008 standard for floating point arithmetic. In one embodiment, the cores 550 include 64 single-precision (32-bit) floating point cores, 64 integer cores, 32 double-precision (64-bit) floating point cores, and 8 tensor cores.

Tensor cores configured to perform matrix operations, and, in one embodiment, one or more tensor cores are included in the cores 550. In particular, the tensor cores are configured to perform deep learning matrix arithmetic, such as convolution operations for neural network training and inferencing. In one embodiment, each tensor core operates on a 4×4 matrix and performs a matrix multiply and accumulate operation D=A×B+C, where A, B, C, and D are 4×4 matrices.

In one embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In one embodiment, the SFUs 552 may include a tree traversal unit configured to traverse a hierarchical tree data structure. In one embodiment, the SFUs 552 may include texture unit configured to perform texture map filtering operations. In one embodiment, the texture units are configured to load texture maps (e.g., a 2D array of texels) from the memory 304 and sample the texture maps to produce sampled texture values for use in shader programs executed by the SM 440. In one embodiment, the texture maps are stored in the shared memory/L1 cache 470. The texture units implement texture operations such as filtering operations using mip-maps (i.e., texture maps of varying levels of detail). In one embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In one embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In one embodiment, the shared memory/L1 cache 570 comprises 128 KB of storage capacity and is in the path from the SM 440 to the partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In one embodiment, the PPU 300 is embodied on a single semiconductor substrate. In another embodiment, the PPU 300 is included in a system-on-a-chip (SoC) along with one or more other devices such as additional PPUs 300, the memory 204, a reduced instruction set computer (RISC) CPU, a memory management unit (MMU), a digital-to-analog converter (DAC), and the like.

In one embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Figure 5B:
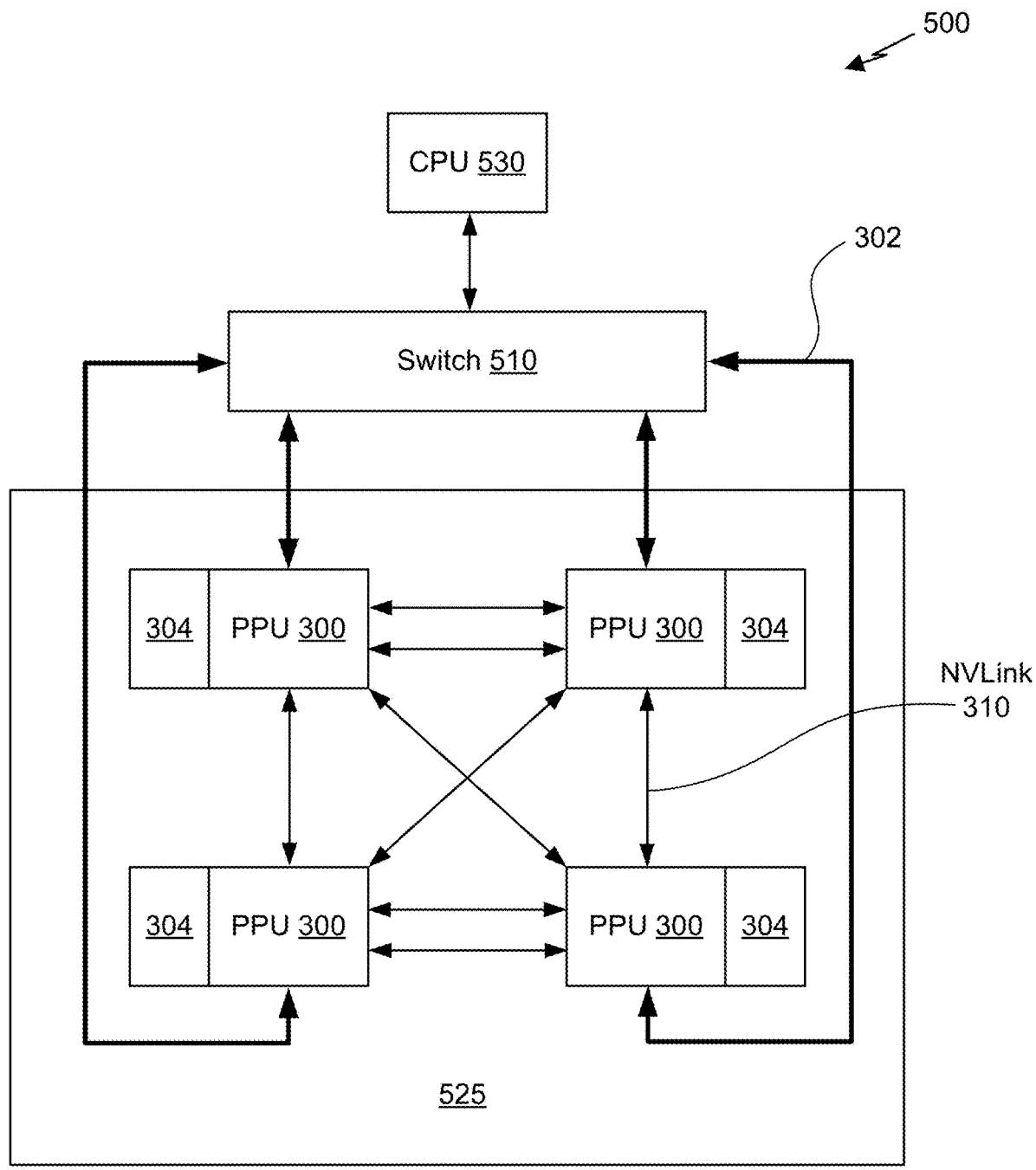
FIG. 5B is a conceptual diagram of a processing system implemented using the PPU of FIG. 3, in accordance with one embodiment.

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased FIG. 5B is a conceptual diagram of a processing system 500 implemented using the PPU 300 of FIG. 3, in accordance with one embodiment. The processing system 500 may be configured to implement the method 110 shown in FIG. 1A, the method steps 122-128 shown in FIG. 1B, the method 260 shown in FIG. 2D, or any combination thereof. The processing system 500 includes a CPU 530, switch 510, and multiple PPUs 300 each and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In one embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 either directly or through the switch 510 and/or the interconnect 302 provides one or more communication links between each of the PPUs 300 and the CPU 530 either directly or through the switch 510. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In one embodiment, the CPU 530, switch 510, and the parallel processing module 525 are situated on a single semiconductor platform.

In one embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In one embodiment, the NVLink 310 allows direct load/store/atomic access from the CPU 530 to each PPU's 300 memory 304. In one embodiment, the NVLink 310 supports coherency operations, allowing data read from the memories 304 to be stored in the cache hierarchy of the CPU 530, reducing cache access latency for the CPU 530. In one embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
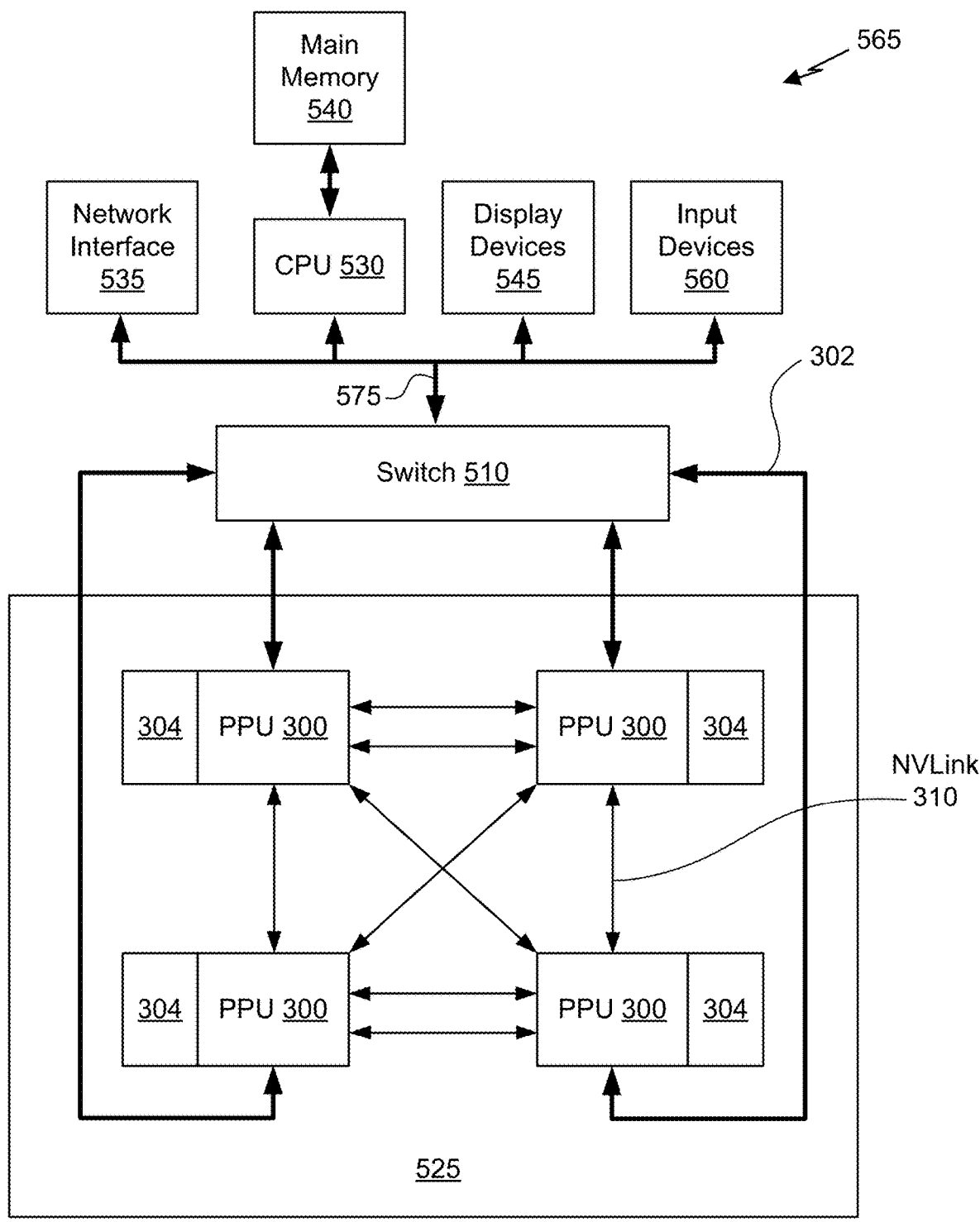
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 110 shown in FIG. 1A, the method steps 122-128 shown in FIG. 1B, the method 260 shown in FIG. 2D, or any combination thereof.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, i.e. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

Graphics Processing Pipeline

In one embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (i.e., pixel data for each of the pixels of the display).

An application writes model data for a scene (i.e., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In one embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (i.e., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6:
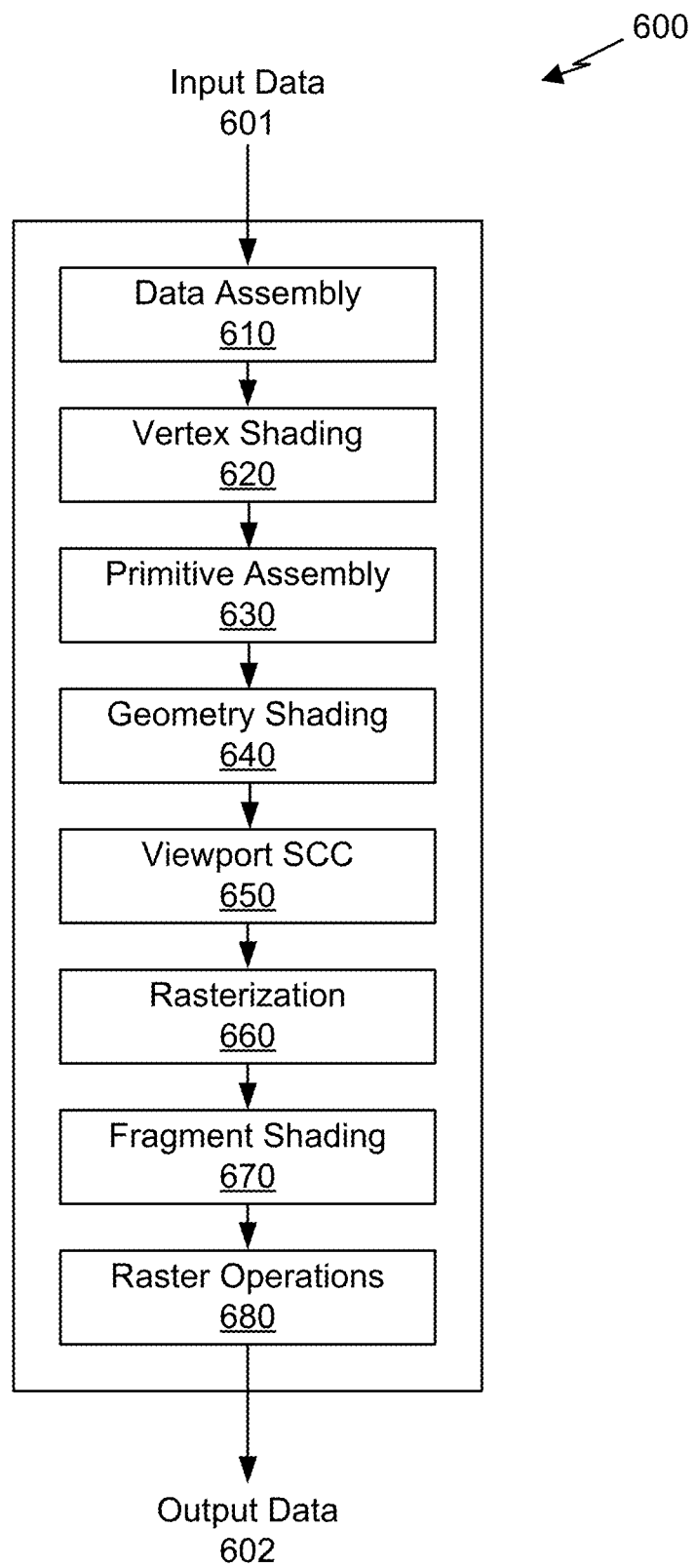
FIG. 6 is a conceptual diagram of a graphics processing pipeline implemented by the PPU of FIG. 3, in accordance with one embodiment.

FIG. 6 is a conceptual diagram of a graphics processing pipeline 600 implemented by the PPU 300 of FIG. 3, in accordance with one embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In one embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In one embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (i.e., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (i.e., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (i.e., a collection of associated vertices) to the geometry shading stage 640.

The geometry shading stage 640 processes geometric primitives by performing a set of operations (i.e., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In one embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in one embodiment, the viewport SCC stage 650 may utilize the data. In one embodiment, primitive data processed by one or more of the stages in the graphics processing pipeline 600 may be written to a cache (e.g. L1 cache, a vertex cache, etc.). In this case, in one embodiment, the viewport SCC stage 650 may access the data in the cache. In one embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In one embodiment, z-testing may also be performed to determine if the geometric primitive is occluded by other geometric primitives that have already been rasterized. The rasterization stage 660 generates fragment data (i.e., interpolated vertex attributes associated with a particular sample location for each covered pixel) that are transmitted to the fragment shading stage 670.

The fragment shading stage 670 processes fragment data by performing a set of operations (i.e., a fragment shader or a program) on each of the fragments. The fragment shading stage 670 may generate pixel data (i.e., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (i.e., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 200. Other stages of the graphics processing pipeline 600 may be implemented by programmable hardware units such as the SM 440 of the PPU 300.

The graphics processing pipeline 600 may be implemented via an application executed by a host processor, such as a CPU. In one embodiment, a device driver may implement an application programming interface (API) that defines various functions that can be utilized by an application in order to generate graphical data for display. The device driver is a software program that includes a plurality of instructions that control the operation of the PPU 300. The API provides an abstraction for a programmer that lets a programmer utilize specialized graphics hardware, such as the PPU 300, to generate the graphical data without requiring the programmer to utilize the specific instruction set for the PPU 300. The application may include an API call that is routed to the device driver for the PPU 300. The device driver interprets the API call and performs various operations to respond to the API call. In some instances, the device driver may perform operations by executing instructions on the CPU. In other instances, the device driver may perform operations, at least in part, by launching operations on the PPU 300 utilizing an input/output interface between the CPU and the PPU 300. In one embodiment, the device driver is configured to implement the graphics processing pipeline 600 utilizing the hardware of the PPU 300.

Various programs may be executed within the PPU 300 in order to implement the various stages of the graphics processing pipeline 600. For example, the device driver may launch a kernel on the PPU 300 to perform the vertex shading stage 620 on one SM 440 (or multiple SMs 440). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on an SM 440.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

In one embodiment the first CNN and the second CNN of FIG. 2C are implemented using PPU 300. For example, PPU 300 may be configured to execute code that implements the parameter adjustment engine 134 of FIG. 1C, which may include the first CNN and the second CNN of FIG. 2C.

While various embodiments have been described above, it should be understood that they have been presented by way of example only, and not limitation. Thus, the breadth and scope of the present application should not be limited by any of the above-described exemplary embodiments, but should be defined only in accordance with the following and later-submitted claims and their equivalents.

What is claimed is:

1. An inverse graphics rendering system, configured to:
receive image data in a two-dimensional space;
determine initial parameter values for geometric primitives in a three-dimensional space, wherein the geometric primitives, when rendered, produce rendered image data in the two-dimensional space that approximates the image data;
render the geometric primitives by:
generating a visibility function for each geometric primitive using the initial parameter values;
filtering each visibility function to produce corresponding smooth and continuous functions;
computing derivatives in the two-dimensional space for each smooth and continuous function; and
computing shaded pixel values of the rendered image data based on the smooth and continuous functions;
compare the image data and the rendered image data to produce differences; and
update the initial parameter values based on the differences and the derivatives.

2. The inverse graphics rendering system of claim 1, wherein derivatives of the visibility functions are non-zero at edges of the geometric primitives.

3. The inverse graphics rendering system of claim 2, wherein the derivatives of the visibility functions for edges shared between at least two geometric primitives sum to zero.

4. The inverse graphics rendering system of claim 1, wherein the filtering comprises applying a filter having a width of a single pixel to each visibility function.

5. The inverse graphics rendering system of claim 1, wherein the initial parameter values correspond to a three-dimensional model and the image data defines an image style.

6. The inverse graphics rendering system of claim 1, further comprising:
a first neural network configured to process the image data to produce first feature vectors; and
a second neural network configured to process the rendered image data to produce second feature vectors, wherein the image data is replaced with the first feature vectors and the rendered image data is replaced with the second feature vectors before the image data is compared with the rendered image data to produce the differences.

7. The inverse graphics rendering system of claim 1, further comprising, prior to generating the visibility functions for each geometric primitive, sorting the geometric primitives and discarding a portion of the geometric primitives that are occluded.

8. The inverse graphics rendering system of claim 1, wherein the geometric primitives comprise at least one illumination blocker.

9. A method for inverse graphics rendering, comprising:
receiving image data in a two-dimensional space;
determining initial parameter values for geometric primitives in a three-dimensional space, wherein the geometric primitives, when rendered, produce rendered image data in the two-dimensional space that approximates the image data;
rendering the geometric primitives by:
generating a visibility function for each geometric primitive using the initial parameter values;
filtering each visibility function to produce corresponding smooth and continuous functions;
computing derivatives in the two-dimensional space for each smooth and continuous function; and
computing shaded pixel values of the rendered image data based on the smooth and continuous functions;
comparing the image data and the rendered image data to produce differences; and
updating the initial parameter values based on the differences and the derivatives.

10. The method of claim 9, wherein derivatives of the visibility functions are non-zero at edges of the geometric primitives.

11. The method of claim 10, wherein the derivatives of the visibility functions for edges shared between at least two geometric primitives sum to zero.

12. The method of claim 9, wherein the filtering comprises applying a filter having a width of a single pixel to each visibility function.

13. The method of claim 9, wherein the initial parameter values correspond to a three-dimensional model and the image data defines an image style.

14. The method of claim 9, further comprising:
processing, by a first neural network, the image data to produce first feature vectors; and
processing, by a second neural network, the rendered image data to produce second feature vectors, wherein the image data is replaced with the first feature vectors and the rendered image data is replaced with the second feature vectors before the image data is compared with the rendered image data to produce the differences.

15. The method of claim 9, further comprising, prior to generating the visibility functions for each geometric primitive, sorting the geometric primitives and discarding a portion of the geometric primitives that are occluded.

16. The method of claim 9, wherein the geometric primitives comprise at least one illumination blocker.

17. A non-transitory, computer-readable storage medium storing instructions that, when executed by a processing unit, cause the processing unit to:
receive image data in a two-dimensional space;
determine initial parameter values for geometric primitives in a three-dimensional space, wherein the geometric primitives, when rendered, produce rendered image data in the two-dimensional space that approximates the image data;
render the geometric primitives by:
generating a visibility function for each geometric primitive using the initial parameter values;
filtering each visibility function to produce corresponding smooth and continuous functions;
computing derivatives in the two-dimensional space for each smooth and continuous function; and
computing shaded pixel values of the rendered image data based on the smooth and continuous functions;
compare the image data and the rendered image data to produce differences; and
update the initial parameter values based on the differences and the derivatives.

18. The non-transitory, computer-readable storage medium of claim 17, wherein derivatives of the visibility functions are non-zero at edges of the geometric primitives.

19. The non-transitory, computer-readable storage medium of claim 18, wherein the derivatives of the visibility functions for edges shared between at least two geometric primitives sum to zero.

20. The non-transitory, computer-readable storage medium of claim 17, wherein the filtering comprises applying a filter having a width of a single pixel to each visibility function.

* * * * *